(12) United States Patent
He et al.

(10) Patent No.: US 12,028,520 B2
(45) Date of Patent: Jul. 2, 2024

(54) MULTI-TYPE TREE CODING

(71) Applicant: VID SCALE, INC., Wilmington, DE (US)

(72) Inventors: Yuwen He, San Diego, CA (US); Fanyi Duanmu, Cupertino, CA (US); Xiaoyu Xiu, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/760,938

(22) PCT Filed: Nov. 1, 2018

(86) PCT No.: PCT/US2018/058620
§ 371 (c)(1),
(2) Date: May 1, 2020

(87) PCT Pub. No.: WO2019/089874
PCT Pub. Date: May 9, 2019

(65) Prior Publication Data
US 2020/0304788 A1 Sep. 24, 2020

Related U.S. Application Data

(60) Provisional application No. 62/617,696, filed on Jan. 16, 2018, provisional application No. 62/580,094, filed on Nov. 1, 2017.

(51) Int. Cl.
*H04N 19/119* (2014.01)
*H04N 19/117* (2014.01)
(Continued)

(52) U.S. Cl.
CPC ......... *H04N 19/119* (2014.11); *H04N 19/117* (2014.11); *H04N 19/176* (2014.11); *H04N 19/96* (2014.11)

(58) Field of Classification Search
CPC .. H04N 19/119; H04N 19/117; H04N 19/176; H04N 19/96; H04N 19/463; H04N 19/70; H04N 19/14
See application file for complete search history.

(56) References Cited

U.S. PATENT DOCUMENTS

2011/0032990 A1 2/2011 Choi et al.
2013/0251026 A1 9/2013 Guo et al.
(Continued)

FOREIGN PATENT DOCUMENTS

| CN | 104205837 A | 12/2014 |
| JP | 2013-501449 A | 1/2013 |
| WO | 2018/110600 A1 | 6/2018 |

OTHER PUBLICATIONS

"JEM-2.0 Reference Software", Available at <https://jvet.hhi.fraunhofer.de/svn/svn_HMJEMSoftware/tags/HM-16.6-JEM-2.0>, 1 page.

(Continued)

*Primary Examiner* — Joseph W Becker
(74) *Attorney, Agent, or Firm* — Condo Roccia Koptiw LLP

(57) ABSTRACT

A block may be identified. The block may be partitioned into one or more (e.g., two) sibling nodes (e.g., sibling nodes B0 and B1). A partition direction and a partition type for the block may be determined. If the partition type for the block is binary tree (BT), one or more (e.g., two) partition parameters may be determined for sibling node B0. A partition parameter (e.g., a first partition parameter) may be determined for sibling node B1. A decoder may determine whether to receive an indication of a second partition parameter for B1 based on, for example, the partition direction for the block, the partition type for the block, and the first partition parameter for B1. The decoder may derive (Continued)

the second partition parameter based on, for example, the partition direction and type for the block, and the first partition parameter for B1.

20 Claims, 18 Drawing Sheets

(51) Int. Cl.
*H04N 19/176* (2014.01)
*H04N 19/96* (2014.01)

(56) References Cited

U.S. PATENT DOCUMENTS

| | | |
|---|---|---|
| 2017/0208336 A1 | 7/2017 | Li et al. |
| 2018/0103268 A1* | 4/2018 | Huang .................. H04N 19/91 |
| 2018/0109814 A1* | 4/2018 | Chuang ................ H04N 19/645 |
| 2019/0327476 A1* | 10/2019 | Lee ...................... H04N 19/176 |
| 2019/0364279 A1 | 11/2019 | Yasugi et al. |

OTHER PUBLICATIONS

JEM-3.0 Reference Software, Available at <https://jvet.hhi.fraunhofer.de/svn/svn_HMJEMSoftware/tags/HM-16.6-JEM-3.0/>, 1 page.

Alshina et al., "Known Tools Performance Investigation for Next Generation Video Coding", VCEG-AZ05, ITU—Telecommunications Standardization Sector, Study Group 16 Question 6, Video Coding Experts Group (VCEG), 52nd Meeting: Warsaw, Poland, Jun. 19-26, 2015, 5 pages.

An et al., "Block Partitioning Structure for Next Generation Video Coding", MediaTek Inc., COM 16-C 966 R3-E, Sep. 2015, pp. 1-8.

Bordes et al., "Description of SDR, HDR and 360° Video Coding Technology Proposal by Qualcomm and Technicolor—Medium Complexity Version", JVET-J0022R1, Joint Video Experts Team (JVET) of ITU-T SG 16 WP 3 and ISO/IEC JTC 1/SC 29/WG 11, 10th Meeting: San Diego, US, Apr. 10-20, 2018, 83 pages.

Bross et al., "High Efficiency Video Coding (HEVC) Text Specification Draft 8", JCTVC-J1003, Joint Collaborative Team on Video Coding (JCT-VC) of ITU-T SG16 WP3 and ISO/IEC JTC1/SC29/WG11, Jul. 11-20, 2012 294 pages.

Chen et al., "Algorithm Description for Versatile Video Coding and Test Model 2 (VTM 2)", JVET-K1002-V2, Joint Video Experts Team (JVET) of ITU-T SG 16 WP 3 and ISO/IEC JTC 1/SC 29/WG11, 11th Meeting: Ljubljana, SI, Jul. 10-18, 2018, pp. 1-21.

Chen et al., "Coding Tools Investigation for Next Generation Video Coding", Qualcomm Incorporated, COM 16-C 806-E, Jan. 2015, pp. 1-7.

Huang et al., "AHG5: Speed-Up for JEM-3.1", JVET-D0077, MediaTek Inc., Joint Video Exploration Team (JVET) of ITU-T SG 16 WP 3 and ISO/IEC JTC 1/SC 29/WG 11, 4th Meeting: Chengdu, CN, Oct. 2016, pp. 1-6.

Huang et al., "EE2.1: Quadtree Plus Binary Tree Structure Integration with JEM Tools", JVET-C0024, MediaTek Inc., Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-5.

ITU-T, "Advanced Video Coding for Generic Audiovisual Services", H.264, Series H: Audiovisual and Multimedia Systems, Infrastructure of Audiovisual Services—Coding of Moving Video, Nov. 2007, 564 pages.

Karczewicz et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting: Warsaw, Poland, Jun. 19-26, 2015, 2 pages.

Li et al., "Multi-Type-Tree", JVET-D0117, Qualcomm Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-3.

Ma et al., "Description of Core Experiment 1 (CE 1): Partitioning", JVET-J1021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-30.

Ohm et al., "Report of AHG on Future Video Coding Standardization Challenges", AHG, ISO/IEC JTC1/SC29/WG11 MPEG2014/M36782, Warsaw, Poland, Jun. 2015, 4 pages.

SMPTE, "VC-1 Compressed Video Bitstream Format and Decoding Process", SMPTE 421M-2006, Apr. 2006, 493 pages.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Tourapis et al., "H.264/14496-10 AVC Reference Software Manual", JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.

Leannec et al., "Asymmetric Coding Units in QTBT", JVET-D0064, Technicolor, Joint Video Exploration Team (JVET) of ITU-T SG 16 WP 3 and ISO/IEC JTC 1/SC 29WG 11, 4th Meeting: Chengdu, CN, Oct. 15-21, 2016, 11 pages.

Li et al., "Multi-Type-Tree", JVET-D0117r1, Qualcomm Inc., Joint Video Exploration Team (JVET) of ITU-T SG 16 WP 3 and ISO/IEC JTC 1/SC 29/WG 11 4th Meeting: Chengdu, CN, Oct. 15-21, 2016, pp. 1-3.

Bross et al., "High Efficiency Video Coding (HEVC) text specification draft 10 (for FDIS & Consent)", JCTVC-L1003_v10, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 332 pages.

Chen et al., "Algorithm Description of Joint Exploration Test Model 7 (JEM 7)", JVET-G1001-v1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

* cited by examiner

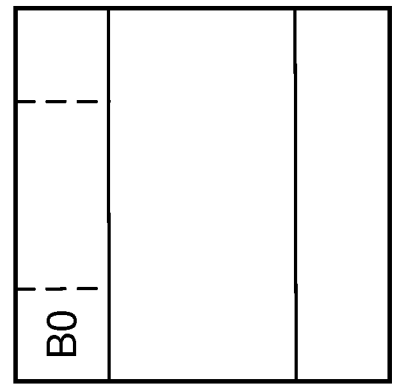
FIG. 15E
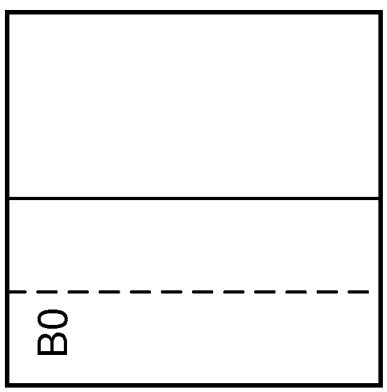
FIG. 15A
FIG. 15B
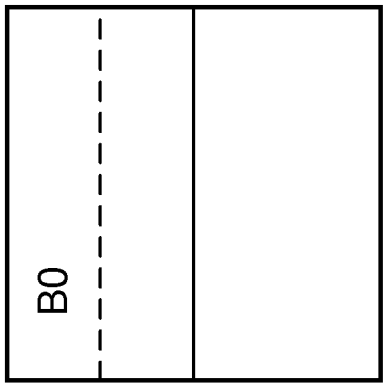
FIG. 15D
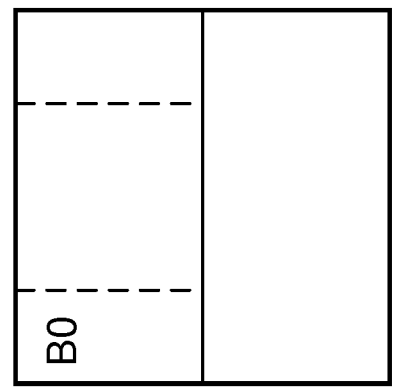
FIG. 15C

MULTI-TYPE TREE CODING

CROSS-REFERENCE TO RELATED APPLICATIONS

This application is the National Stage Entry under 35 U.S.C. § 371 of Patent Cooperation Treaty Application No. PCT/US2018/058620, filed Nov. 1, 2018, which claims the benefit of U.S. Provisional Application Ser. No. 62/580,094, filed Nov. 1, 2017 and U.S. Provisional Application Ser. No. 62/617,696, filed Jan. 16, 2018, the contents of which are incorporated by reference herein.

BACKGROUND

A variety of digital video compression technologies enable efficient digital video communication, distribution and consumption. Some examples of standardized video compression technologies are H.261, MPEG-1, MPEG-2, H.263, MPEG-4 part2 and H.264/MPEG-4 part 10 AVC. Advanced video compression technologies, such as High Efficiency Video Coding (HEVC), may provide twice the compression or half the bit rate at the same video quality compared to H.264/AVC.

SUMMARY

Systems, methods, and instrumentalities may be provided for Multi-Type Tree (MTT) coding. A block may be identified. The block may be a root node of a quad tree. The block may be partitioned into one or more (e.g., two) sibling nodes (e.g., sibling nodes B0 and B1). A partition direction and a partition type for the block may be determined. A partition direction may be, for example, horizontal or vertical. A partition type may be, for example, binary tree (BT) or triple tree (TT). If the partition type for the block is binary tree (BT), one or more (e.g., two) partition parameters (e.g., direction and/or type) may be determined for sibling node B0, e.g. via signaling. A (e.g., one) partition parameter (e.g., a first partition parameter) may be determined for sibling node B1, e.g. via signaling. For example, a partition direction and a partition type may be determined for B0, and a partition direction or type may be determined for B1. A decoder may determine whether to receive an indication of a second partition parameter for B1 based on, for example, the partition direction for the block, the partition type for the block, and the first partition parameter for B1. The decoder may derive the second partition parameter based on, for example, the partition direction for the block, the partition type for the block, and the first partition parameter for B1, for example if the decoder determines not to receive the indication. If the partition type for the block is BT, the decoder may derive the second parameter based on the partition parameters for B0. The decoder may determine the second partition parameter based on the indication, for example if the decoder determines to receive the indication. B1 may be decoded based on the first partition parameter and the second partition parameter.

In an example, signaling of the partition type of a sibling node may be skipped. The first partition parameter may be (e.g., may indicate) a partition direction for B1 and the second partition parameter may be a partition type for B1. The decoder may determine to receive (e.g., may receive) the partition type for B1 if the partition direction for B0 and the partition direction for B1 are different. The decoder may determine to receive the partition type for B1 if the partition type for B0 is triple tree (TT) and the partition direction for B0 and the partition direction for B1 are the same as the partition direction for the block. The decoder may determine not to receive the partition type for B1, if the partition type for B0 is BT, and the partition direction for B0 and the partition direction for B1 are the same. The decoder may derive the partition type for B1 as TT. The decoder may determine not to receive the partition type for B1 if the partition type for B0 is TT and the partition direction for B0 and the partition direction for B1 are orthogonal to the partition direction for the block, and the decoder may derive the partition type for B1 as BT.

In an example, signaling of the partition direction of a sibling node may be skipped. The first partition parameter may be a partition type for B1 and the second partition parameter may be a partition direction for B1. The decoder may determine to receive the partition direction for B1 if the partition type for B0 and the partition type for B1 are different. The decoder may determine to receive the partition direction for B1 if the partition type for B0 and the partition type for B1 are both BT and the partition direction for B0 and the partition direction for the block are not the same. The decoder may determine to receive the partition direction for B1 if the partition type for B0 and the partition type for B1 are both TT and the partition direction for B0 and the partition direction for the block are not orthogonal. The decoder may determine not to receive the partition direction for B1, if the partition type for B0 and the partition type for B1 are both BT, and the partition direction for B0 and the partition direction for the block are the same. The decoder may derive the partition direction for B1 to be orthogonal to the partition direction for B0. The decoder may determine not to receive the partition direction for B1 if the partition type for B0 and the partition type for B1 are both TT and the partition direction for B0 and the partition direction for the block are orthogonal, and the decoder may derive the partition direction for B1 to be orthogonal to the partition direction for B0.

The partition type for the block may be TT. B1 may be a middle sibling node. The first partition parameter may be a partition direction for B1 and the second partition parameter may be a partition type for B1. The decoder may receive the partition type for B1 if, for example, the partition direction for B1 is not the same as the partition direction for the block. The decoder may determine the partition type for B1 to be TT if, for example, the partition direction for B1 is the same as the partition direction for the block.

The first partition parameter may be a partition type for B1 and the second partition parameter may be a partition direction for B1. The decoder may receive the partition direction for B1 if, for example, the partition type for B1 is TT. The decoder may derive the partition direction for B1 to be orthogonal to the partition direction for the block if, for example, the partition type for B1 is BT.

Video content may be encoded in an MTT format. A block may be identified. The block may be a root node of a quad tree. The block may be binary tree (BT) partitioned into one or more (e.g., two) sibling nodes (e.g., sibling nodes B0 and B1). A partition direction and a partition type for the block may be determined. If the partition type for the block is BT, one or more (e.g., two) partition parameters (e.g., direction and/or type) may be determined for sibling node B0. A (e.g., one) partition parameter (e.g., a first partition parameter) may be determined for sibling node B1. For example, a partition direction and a partition type may be determined for B0, and a partition direction or type may be determined for B1. An encoder may determine whether to include (e.g., may include) a second partition parameter for B1 in a bitstream based on, for example, the partition direction for the block, the partition type for the block, and the first partition parameter for B1. The encoder may include indications of the partition parameters for B0, the first partition parameter for B1, and the partition direction for the block in the bitstream.

In an example, an encoder may skip signaling of the partition type of a sibling node. The partition type for the block may be BT. The first partition parameter may be a partition direction for B1 and the second partition parameter may be a partition type for B1. The encoder may determine to include the partition type for B1 in the bitstream if the partition direction for B0 and the partition direction for B1 are different. The encoder may determine to include the partition type for B1 in the bitstream if the partition type for B0 is triple tree (TT) and the partition direction for B0 and the partition direction for B1 are the same as the partition direction for the block. The encoder may determine not to include the partition type for B1 in the bitstream if the partition type for B0 is BT and the partition direction for B0 and the partition direction for B1 are the same. The encoder may determine not to include the partition type for B1 in the bitstream if the partition type for B0 is TT and the partition direction for B0 and the partition direction for B1 are orthogonal to the partition direction for the block.

The partition type for the block may be TT. The first partition parameter may be a partition direction for B1 and the second partition parameter may be a partition type for B1. The encoder may include the partition type for B1 in the bitstream if, for example, the partition direction for B1 is not the same as the partition direction for the block. The encoder may determine to not include the partition type for B1 in the bitstream if, for example, the partition direction for B1 is the same as the partition direction for the block.

A partition type for a current block may be received. An availability of a first partition direction and a second partition direction for the block may be determined based on the partition type. A decoder may determine to receive a current partition direction based on the availability of the first partition direction and the second partition direction. The current partition direction may be the same as one or more of the first partition direction or the second partition direction. The decoder may decode the block based on the current partition direction. The decoder may determine not to receive the current partition direction if only one of the first partition direction or the second partition direction is available, and the decoder may determine the current partition direction to be the available partition direction. The decoder may determine to receive the current partition direction if both of the first partition direction and the second partition directions are available. The first partition direction may be a vertical direction, and the second partition direction may be a horizontal direction. The vertical direction may be determined to be available if the partition type is BT and the width of the current block is at least double a minimum allowed BT node size. The vertical direction may be determined to be available if the partition type is TT and the width of the current block is at least quadruple the minimum allowed BT size. The horizontal direction may be determined to be available if the partition type is BT and the height of the current block is at least double the minimum allowed BT node size. The vertical direction may be determined to be available if the partition type is TT and the height of the current block is at least quadruple the minimum allowed BT size.

The block may be TT partitioned into three sub-blocks, B0, B1 and B2. One or more boundaries of B0, B1 or B2 may be determined. A deblocking filter may be applied to the boundaries.

BRIEF DESCRIPTION OF THE DRAWINGS

Like reference numerals in the figures indicate like elements.

FIGS. 15A-E show examples of coding result reuse for MTT partitions.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Video coding systems may compress digital video signals, for example, to reduce storage and/or transmission bandwidth. There are a variety of types of video coding systems, such as block-based, wavelet-based and object-based systems. Block-based video coding systems may include international video coding standards, such as (Moving Picture Experts Group) MPEG-1/2/4 part 2, H.264/MPEG-4 part 10 Advanced Video Coding (AVC), VC-1 and High Efficiency Video Coding (HEVC).

HEVC may, for example, provide an approximately 50% bit-rate saving or equivalent perceptual quality compared to a prior generation of video coding (e.g. H.264/MPEG AVC). Superior coding efficiency may be achieved (e.g. with additional coding tools) over HEVC. VCEG and MPEG (e.g. Joint Video Exploration Team (JVET)) may support coding technologies that may provide substantial enhancement of coding efficiency over HEVC.

Figure 1:
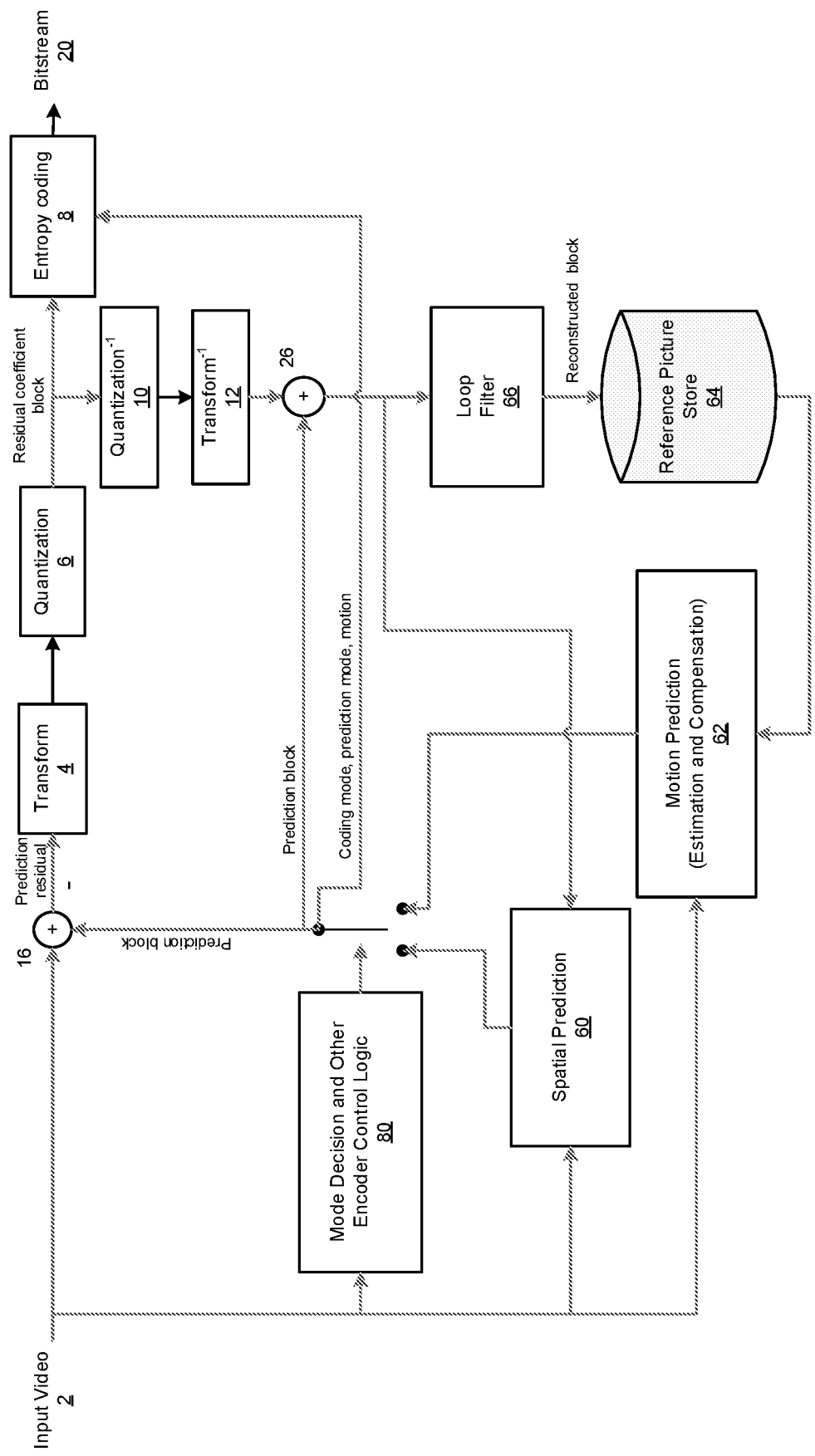
FIG. 1 shows an example of a block-based hybrid video encoding system.

FIG. 1 is an example of a block-based hybrid video encoding system. Input video signal 2 may be processed block by block. Extended block sizes (e.g. a coding unit (CU)) may be used, for example, to efficiently compress high resolution (e.g. 1080p and beyond) video signals. A CU may have a size of, for example, 64×64 pixels. A CU may be partitioned into one or more prediction units (PUs). Prediction may be applied to PUs separately. Spatial prediction 60 and/or temporal prediction 62 may be performed, for example, for an (e.g. each) input video block (e.g. macroblock (MB) or CU).

Spatial prediction (e.g. intra prediction) may predict a current video block, for example, by using pixels from samples of already coded neighboring blocks (e.g. reference samples) in a video picture/slice. Spatial prediction may reduce spatial redundancy that may be inherent in a video signal. Temporal prediction (e.g. inter prediction or motion compensated prediction) may predict a current video block, for example, by using reconstructed pixels from already coded video pictures. Temporal prediction may reduce temporal redundancy that may be inherent in a video signal. A temporal prediction signal for a given video block may be signaled, for example, by one or more motion vectors (MVs). The MVs may indicate an amount and direction of motion between a current block and a reference block. A reference picture index (e.g. for each video block) may be sent, for example, when multiple reference pictures are be supported. A reference picture index may be used to identify a reference picture (e.g. in reference picture store 64) that a temporal prediction signal comes from.

Mode decision block 80 in an encoder may (e.g. after spatial and/or temporal prediction) choose a (e.g. the best) prediction mode based on, for example, a rate-distortion optimization. A prediction block may be subtracted from a current video block 16. A prediction residual may be de-correlated (e.g. using transform 4) and quantized (e.g., using quantization 6). Quantized residual coefficients may be inverse quantized 10 and/or inverse transformed 12, e.g., to form a reconstructed residual. A reconstructed residual may be added back to prediction block 26, for example, to form a reconstructed video block. In-loop filtering 66 (e.g. a de-blocking filter and/or an Adaptive Loop Filter) may be applied to a reconstructed video block, for example, before it is put in reference picture store 64 and used to code future video blocks. Entropy coding unit 8 may form output video bit-stream 20, for example, by compressing and packing a coding mode (e.g. inter or intra), prediction mode information, motion information and/or quantized residual coefficients.

Figure 2:
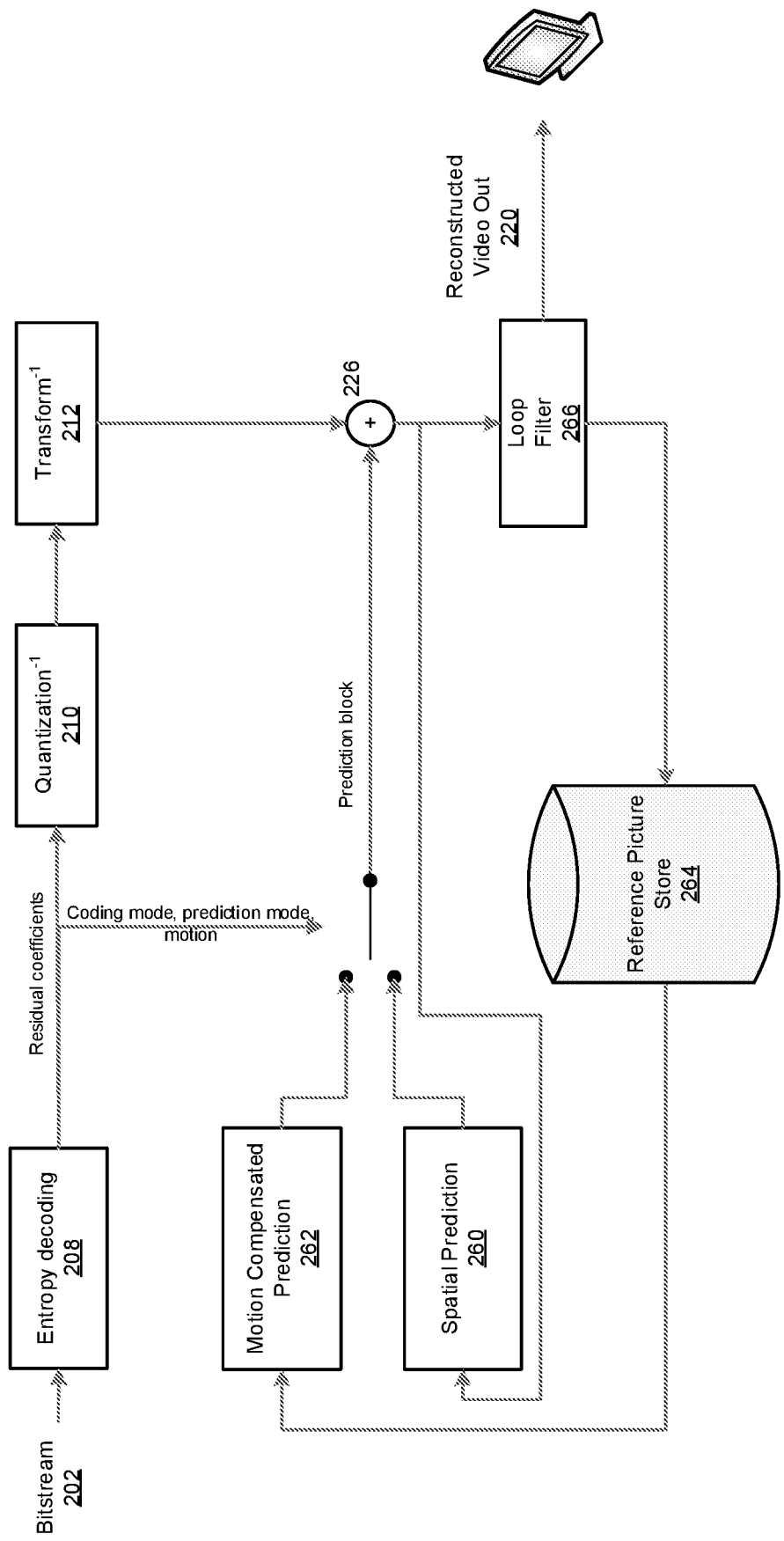
FIG. 2 shows an example of a block-based video decoder.

FIG. 2 is an example of a block-based video decoder. Video bit-stream 202 may be unpacked and entropy decoded at entropy decoding unit 208. Coding mode and prediction information may be sent to the spatial prediction unit 260 (e.g. when intra coded) or temporal prediction unit 262 (e.g. when inter coded), for example, to form a prediction block. Residual transform coefficients may be provided to inverse quantization unit 210 and inverse transform unit 212, e.g., to reconstruct the residual block. A prediction block and a residual block may be added together, e.g., at summation 226. In-loop filtering may be applied to a reconstructed block, for example, before it is stored in reference picture store 264. Reconstructed video in reference picture store 264 may be sent out, for example, to drive a display device and/or to predict future video blocks.

A picture may be split into CUs, for example, based on a quad-tree structure, which may allow for splitting CUs into an appropriate size (e.g. based on signal characteristics of a region). A CU may represent a basic quad-tree split region that may be used to differentiate intra and inter coded blocks. Multiple non-overlapping PUs may be defined inside a CU. A (e.g. each) PU may specify a region with individual prediction parameters (e.g. intra prediction mode, motion vector, reference picture index, etc.). Residuals may be obtained, for example, by applying a prediction process to the PUs. A CU may be further split into one or more transform units (TUs), for example, based on another quad-tree. A (e.g. each) TU may specify a block, for example, by applying residual coding with a transform size equal to the TU size.

The block partitioning structure may provide a significant coding gain over previous video coding standards. CU partitions that may provide a minimum granularity to switch between intra and inter coding may be square and may follow a quad-tree structure. PU partitions may have a limited number of types.

A quad-tree plus binary-tree (QTBT) block partitioning structure may be used. A (e.g. each) coding tree unit (CTU) in a QTBT structure may be a root node of a quad-tree. A block may be partitioned in a quad-tree manner. Quad-tree splitting of a (e.g. one) node may be iterated until the node reaches a minimum allowed quad-tree size (MinQTSize). A quad-tree node may be further partitioned (e.g. by a binary tree) in a horizontal or vertical direction, for example, when the quad-tree size of the node is no larger than a maximum of an allowed binary tree size (MaxBTSize). Splitting of a binary tree may be iterated, for example, until a binary tree node reaches a minimum of an allowed binary tree node size (MinBTSize) or a maximum of an allowed binary tree depth. A binary tree node may be used as a basic unit of prediction and/or transform (e.g., without further partitioning).

In an example of a QTBT partitioning structure, a block size may be 128×128, MinQTSize may be 16×16, MaxBTSize may be 64×64 and MinBTSize may be 4. Quad-tree partitioning may be applied to a block to generate quad-tree leaf nodes. A quad-tree leaf node size may range from 128×128 to 16×16. A quad-tree node size of 128×128 may exceed the maximum binary tree size (e.g. MaxBTSize). A quad-tree node may be further partitioned by the binary tree, for example if the quad-tree node size is less than or equal to the MaxBTSize. A quad-tree node (e.g. the root node of a binary tree) may have a binary tree depth equal to 0. Binary tree partitioning may be iterated, for example, until binary tree depth reaches MaxBTDepth or a binary tree node has width or height equal to MinBTSize.

Figure 3:
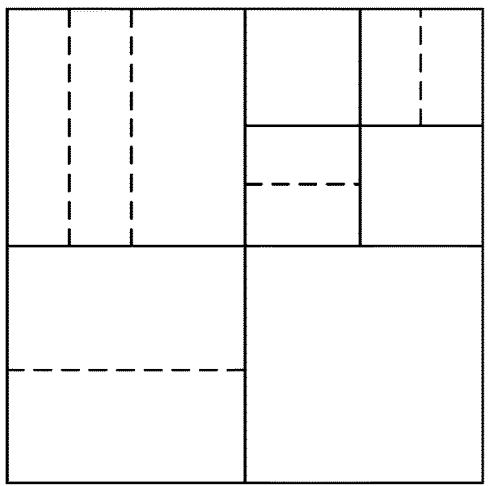
FIG. 3 shows an example of quad-tree plus binary-tree (QTBT) block partitioning.
Figure 3:
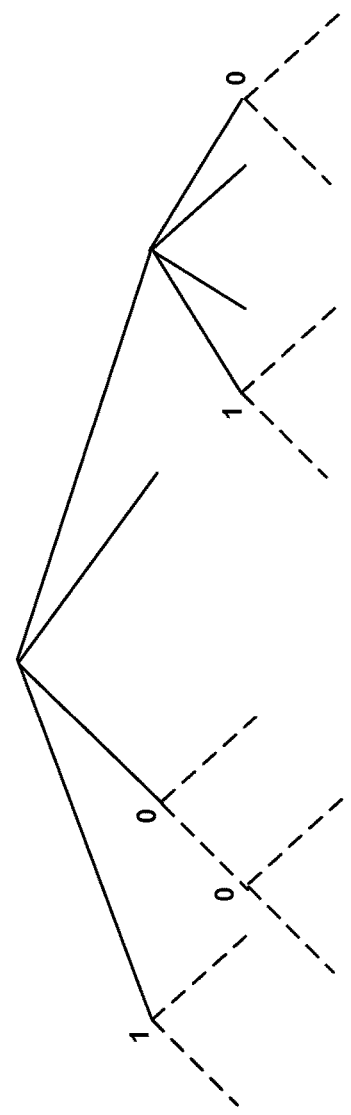

FIG. 3 shows an example of QTBT block partitioning. Solid lines may represent quad-tree splitting and dotted lines may represent binary tree splitting. A partition direction indication (e.g., a flag) may be signaled, for example, to indicate whether horizontal or vertical splitting may be used, e.g., when a binary tree node is further split. Quad-tree splitting may partition a block into four sub-blocks with an equal size.

A block (e.g. in QTBT) may be partitioned, for example, by QT, horizontal BT and vertical BT. Different partitioning procedures may yield the same partition result.

Figure 4B:
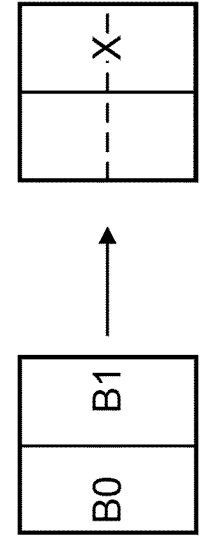
FIGS. 4A-B show examples of QTBT signaling redundancy removal.
Figure 4A:
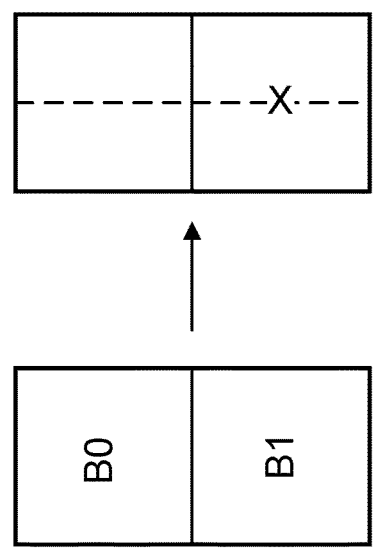

FIGS. 4A-B show examples of QTBT signaling redundancy removal. FIG. 4A shows an example of QTBT signaling redundancy removal with a horizontal BT partition. FIG. 4B shows an example of QTBT signaling redundancy removal with a vertical BT partition.

As shown in FIG. 4A, a block may be partitioned into sub-block B0 and B1 by a horizontal BT partition. Further partitioning of sub-block B0 and B1 by a vertical BT partition may yield a final partition result that may be the same result as a block first partitioned by a vertical BT partition and each sub-block subsequently partitioned by a horizontal BT partition. QTBT may have a constraint that allows a vertical BT partition to be followed by a horizontal BT partition and that disallows a horizontal BT partition followed by a vertical BT partition.

As shown in FIG. 4B, a constraint may be applied to a square block with a vertical BT partition (e.g. creating sub-blocks B0 and B1 shown in FIG. 4B). Further partitioning of sub-blocks B0 and B1 by a horizontal BT may yield a result that is equivalent to a result by a QT partition. Horizontal BT may not be applied to right sub-block B1, for example, when left sub-block B0 is partitioned by a horizontal BT. This constraint may be applicable to a square block, for example, because QT is not applied to a non-square block in QTBT.

Figure 5:
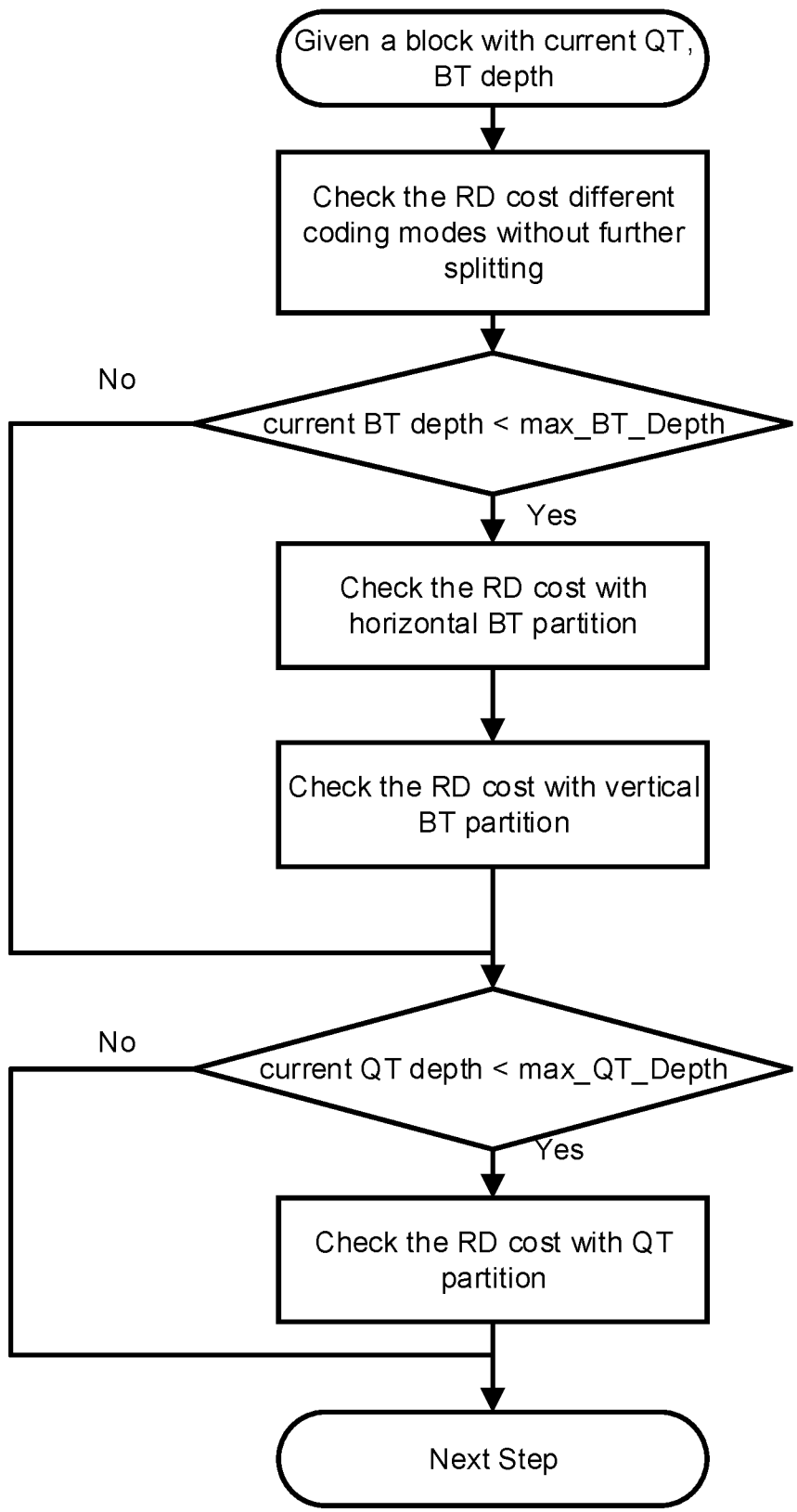
FIG. 5 shows an example of block encoding in QTBT.

FIG. 5 shows an example of block encoding in QTBT. An encoder may (e.g. first) check a rate-distortion (RD) cost without further partition. A cost may be checked using different coding modes (e.g. inter and intra mode) for a given block. A BT depth may be determined. The BT depth may be a depth from a current node to a leaf node of a QT partition tree. A determination may be made whether a current block's BT depth is smaller than a maximum BT depth (MaxBTDepth). Depending on the determination, the encoder may check the RD cost, for example, by applying a horizontal BT partition to a current block. The encoder may check the RD cost, for example, by applying a vertical BT partition to the current block. A determination may be made whether a current block's QT depth is smaller than a maximum QT depth. Depending on the determination, the encoder may check an RD cost, for example, by applying a QT partition to the current block. The partition with the minimal RD cost may be treated as the best partition scheme for a current block.

Fast encoding with a QTBT framework may be performed. One or more partition schemes may be applied, e.g., for a given block. Some sub-blocks may repeat with different partition schemes. For example, three partition schemes may be applied to a (e.g. one) block (e.g. as shown by example in FIG. 6).

Figure 6A:
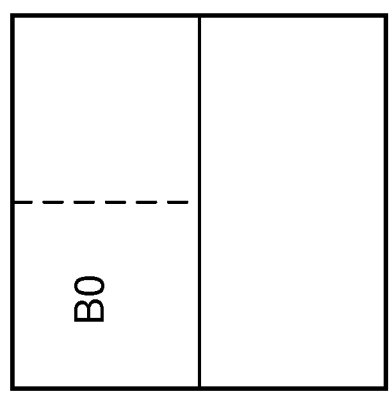
FIGS. 6A-C show examples of coding result reuse.
Figure 6B:
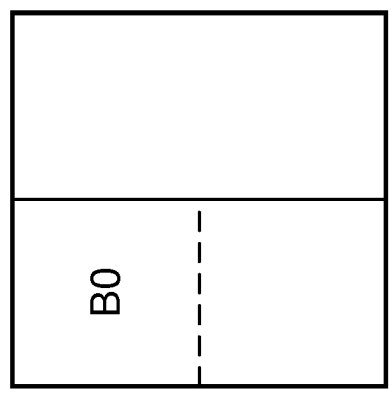
Figure 6C:
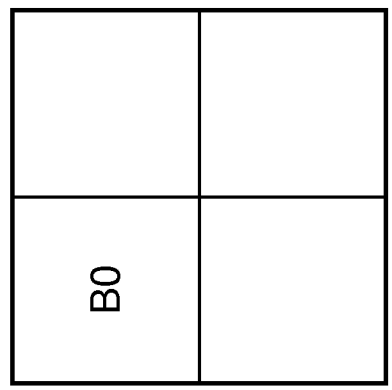

FIGS. 6A-C show examples of coding result reuse for a top-left sub-block in QTBT. FIG. 6A shows an example of applying horizontal BT followed by vertical BT for the top sub-block. FIG. 6B shows an example of applying vertical BT followed by horizontal BT for the left sub-block. FIG. 6C shows an example of applying a QT partition on a square block. The top-left sub-block B0 in the three examples shown in FIGS. 6A-C may be the same. A fast encoding may record the coding result for B0, e.g., at a first time. The stored coding result may be reused for block B0 in other partition schemes. In this way, the top-left block may be encoded only once.

QTBT may allow an equal partition in one or more (e.g., one or two) directions. A multi-type tree (MTT) partition may allow more partitions. MTT may support, for example, five partition types (e.g. as shown by example in FIG. 7).

Figure 7A:
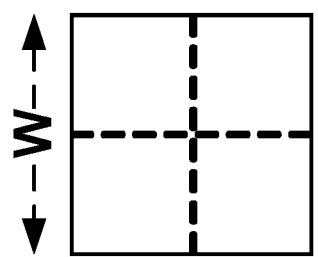
FIGS. 7A-E show examples of multi-type tree (MTT) partitioning types.
Figure 7B:
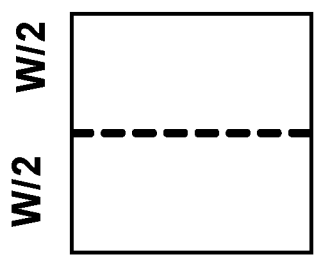
Figure 7C:
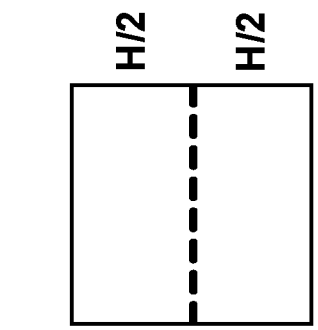
Figure 7D:
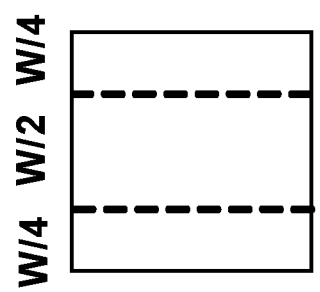
Figure 7E:
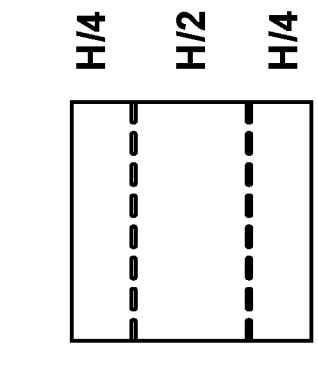

FIGS. 7A-E show examples of MTT partitioning types. FIG. 7A shows an example of quad-tree (QT) partitioning. FIG. 7B shows an example of vertical BT partitioning. FIG. 7C shows an example of horizontal BT partitioning. FIG. 7D shows an example of vertical triple-tree (TT) partitioning. FIG. 7E shows an example of horizontal TT partitioning.

TT partitioning may split a block into three parts. For example, a vertical TT (e.g. as shown in FIG. 7D) may partition a block in the vertical direction. The width of the partitioned sub-blocks may be, for example, equal to ¼, ½ and ¼ of the block width, respectively. BT and TT may be treated as prediction tree (PT). PT depth may be the depth from a current node to a leaf node of a QT partition tree. A block may (e.g. first) be partitioned by QT. A (e.g. each) QT leaf node may be partitioned, for example, by horizontal BT, vertical BT, horizontal TT and/or vertical TT. A block width and height may be a power of 2. A TT partition may create sub-blocks with a width/and or height of ¼ or ½ of the block, for example, so the sub-block width and height may be a power of 2 in MTT. A block may not be partitioned at the middle, which may provide flexibility.

Figure 8:
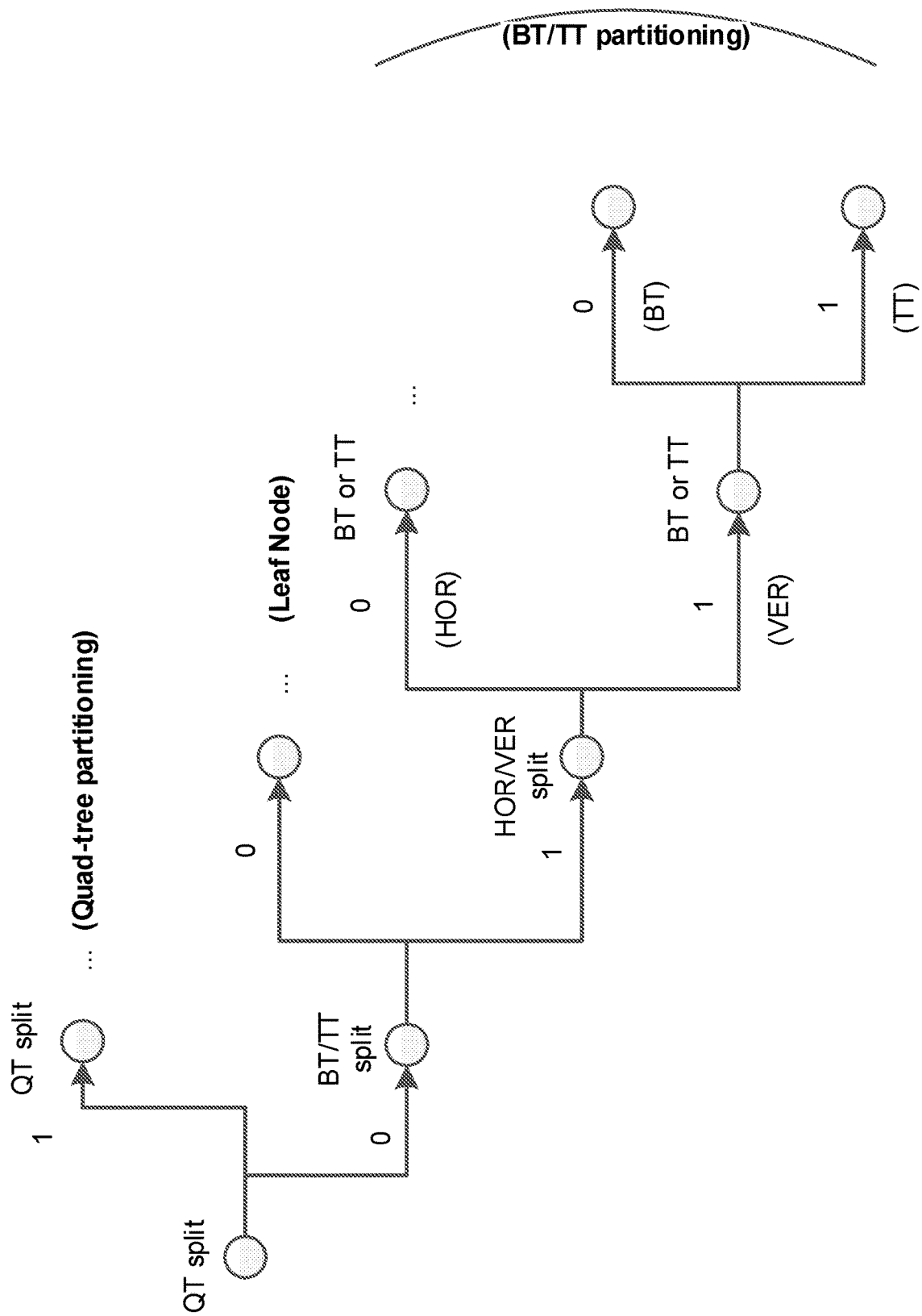
FIG. 8 shows an example of tree-type signaling in MTT.

FIG. 8 shows an example of tree-type signaling in an MTT implementation. One or more (e.g. two) flags may be signaled, for example, when a QT leaf node is split further by BT or TT. A partition direction indication (e.g., a direction flag) may indicate, for example, whether a partition is a horizontal or vertical partition. A partition type indication (e.g., a type flag) may indicate, for example, whether a partition is a BT or TT partition.

An example syntax element (e.g. PT type) may be used in MTT. The PT type may be encoded.

There may be a limitation for a maximum BT depth in QTBT. Both BT and TT may be treated as PT. A maximum PT depth may be applied to BT and TT. BT and TT depth may be controlled separately.

The same partition results may be achieved with different tree partition schemes. For example, a block that is partitioned using horizontal BT into two sub-blocks that are then partitioned using vertical BT into four sub-blocks may achieve the same result by partitioning the block using vertical BT into two sub-blocks that are then partitioned using horizontal BT. Partition constraints may be considered to reduce syntax redundancy and/or reduce encoding complexity.

Deblocking in QTBT be extended to one or more TT boundaries.

A maximum BT depth may be set in QTBT. Adding TT partitioning types may increase encoding complexity. A fast encoding algorithm may be used to control complexity without negatively impacting performance.

An example MTT signaling scheme may be disclosed herein. A context encoding may be based on the partition type of neighboring CUs, e.g., for partition type (BT or TT). A maximum TT depth restriction may be applied to a TT partition. Signaling redundancy may be reduced in an MTT framework. Deblocking in QTBT may be applied to QT and BT boundaries. Deblocking in MTT may be extended to support a TT partition. Fast TT encoding procedures may be performed in MTT coding.

Tree type signaling may be provided in MTT. In an example of MTT (e.g. as shown in FIG. 8), a direction may be signaled (e.g. first) for a (e.g. each) QT leaf node with splitting. A PT type (e.g. BT or TT) may be signaled (e.g., second) for the QT leaf node. Other examples (e.g. as shown in FIG. 9) may have different signaling orders.

Figure 9:
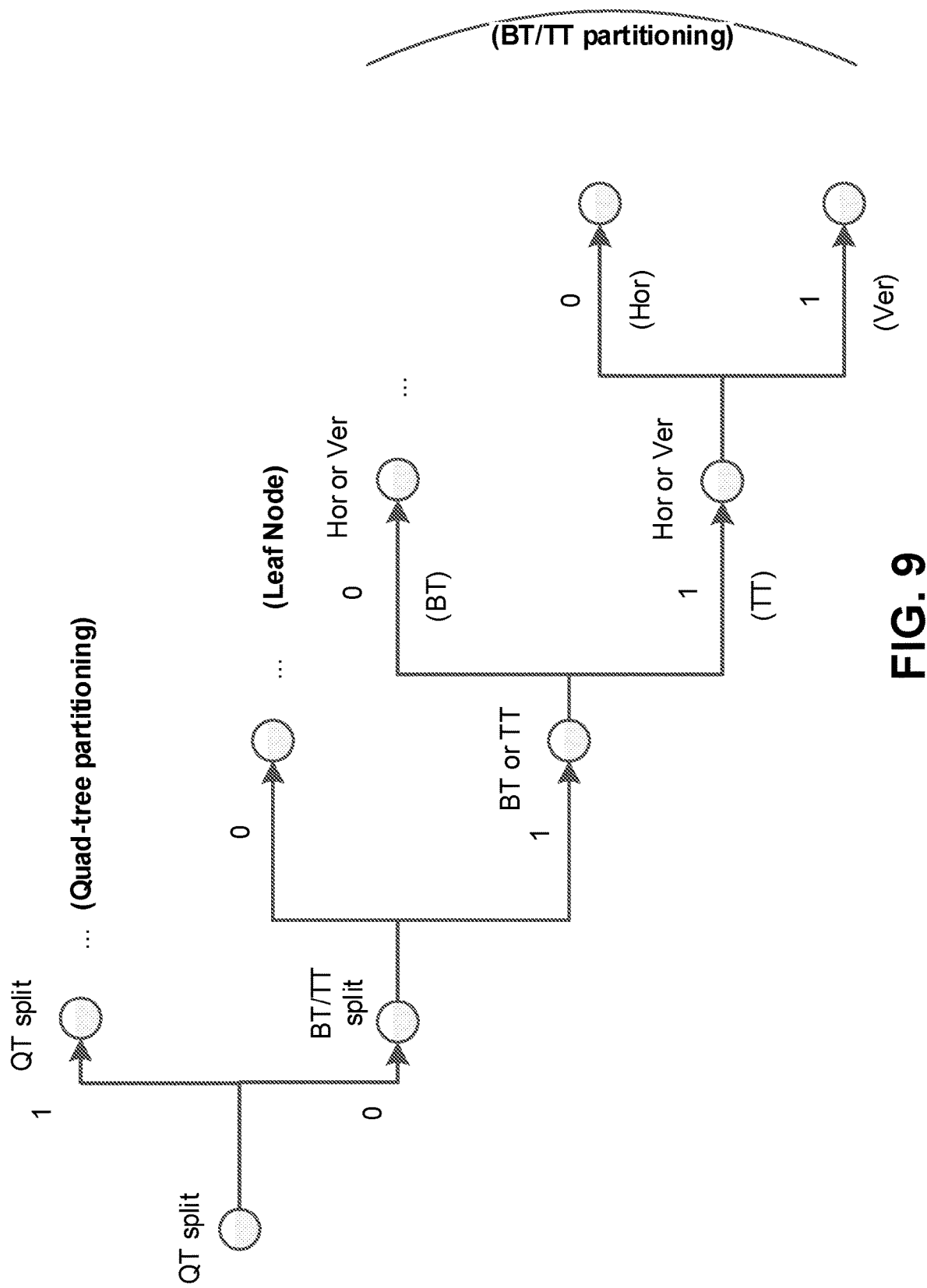
FIG. 9 shows an example of tree-type signaling in MTT.

FIG. 9 shows an example of tree-type signaling in MTT. A PT type (e.g., for a current block) may be signaled. The PT type may be received (e.g., by a decoder). An availability of horizontal and vertical directions may be determined (e.g., checked), for example based on the PT type. A CU size may be no smaller than a minimum BT size (e.g. 4). A vertical BT partition may be available for a current block, for example, when a partition type is BT and the width of the current block is no smaller than 2×MinBTSize. A horizontal BT partition may be available the current block, for example, when the height of the current block is no smaller than 2×MinBTSize. A vertical TT partition may be available for the current block, for example, when a partition type is TT and the width of the current block is no smaller than 4×MinBTSize. A horizontal TT partition may be available the current block, for example, when the height of a current block is no smaller than 4×MinBTSize. A direction may be signaled, for example, (e.g. only) when both directions are available. A direction may be inferred (e.g., derived) as an available direction, for example if (e.g., only) one direction is available. The block may be decoded based on the inferred direction.

Context-based CABAC coding may be used for PT type coding. A context may be derived from one or more blocks, for example blocks left of and above a neighboring CU (e.g. as shown in FIG. 10).

Figure 10:
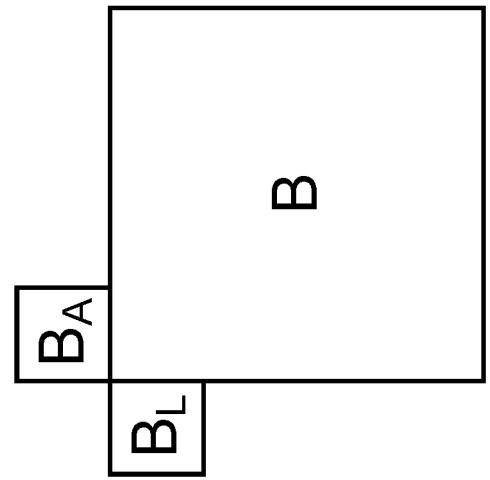
FIG. 10 shows an example of using neighboring blocks for context derivation for a block.

FIG. 10 shows an example of using neighboring blocks for context derivation for a block. Tree depth, TDepth, for a current block may be calculated, for example, in accordance with Eq. (1):

$$TDepth(B) = 2*QTDepth(B) + PTDepth(B) \quad (1)$$

where QTDepth(B) may be a depth of a QT tree from a root and PTDepth(B) may be a depth of a current node B from a QT leaf node.

A relative PT depth for a left block $B_L$, RPTDepth($B_L$), may be calculated, for example, in accordance with Eq. (2):

$$RPTDepth(B_L) = TreeDepth(B) - 2*QTDepth(B_L) \quad (2)$$

A relative PT depth for an above block $B_A$, RPTDepth($B_A$), may be calculated, for example, in accordance with Eq. (3):

$$RPTDepth(B_A) = TreeDepth(B) - 2*QTDepth(B_A) \quad (3)$$

A context index for $B_L$, CI($B_L$), may be derived, for example, in accordance with Eq. (4):

$$CI(B_L) = \begin{cases} 0, & \text{if } (PTType(RPTDepth(B_L)) \text{ is } BT) \\ 1, & \text{else if } (PTType(RPTDepth(B_L)) \text{ is } TT) \\ 3, & \text{otherwise} \end{cases} \quad (4)$$

where PTType(RPTDepth($B_L$)) may be a PT type of block $B_L$ at PT depth RPTDepth($B_L$).

A context index for an above neighboring block $B_A$, CI($B_A$), may be derived, for example, in accordance with Eq. (5):

$$CI(B_A) = \begin{cases} 0, & \text{if } (PTType(RPTDepth(B_A)) \text{ is } BT) \\ 1, & \text{else if } (PTType(RPTDepth(B_A)) \text{ is } TT) \\ 3, & \text{otherwise} \end{cases} \quad (5)$$

A context of current block B may be used for PT type coding, C(B), which may be calculated, for example, in accordance with Eq. (6):

$$C(B) = \min(3, CI(B_L) + CI(B_A)) \quad (6)$$

There may be, for example, four contexts. A context (e.g., context 0) may indicate that (e.g. both) the left and above neighboring blocks at the same tree depth (e.g. relative to the root) have a BT partition type. A context (e.g., context 1) may indicate that neighboring blocks have a different partition type. A context (e.g., context 2) may indicate that (e.g. both) neighboring blocks have a TT partition type. A context (e.g., context 3) may indicate (e.g. all) other cases. One or more contexts (e.g., context 0 and context 2) may be combined as one context to indicate that the left and above neighboring blocks have the same partition type.

A maximum tree depth restriction may be provided for TT. A maximum BT depth (MaxBTDepth) may be used to restrict the depth of a BT tree. Partition trees for luma and chroma components may be separated, e.g., for intra slice coding. Luma and chroma components may share a (e.g. one) partition tree, for example, for inter slice coding. A MaxBTDepth for a luma component and a MaxBTDepth for a chroma component in intra slice and a MaxBTDepth for inter slice may be signaled, for example, in a sequence parameter set (SPS). MaxBTDepth may be applied to TT in MTT. A maximum TT depth MaxTTDepth may be used, for example, for one or more (e.g. each) of the following cases: luma component in intra slice, chroma component in intra slice and inter slice. A difference between MaxTTDepth and MaxBTDepth may be signaled, for example, in SPS, in PPS and/or at picture level (e.g., in a slice header). In an example, an encoder may adaptively set MaxTTDepth for a current picture, e.g., based on an average PT depth of a previous coded picture at the same temporal layer as the current picture. In an example, an encoder may increase MaxTTDepth for pictures at low temporal layers (e.g., because they are reference pictures for high temporal layers). The encoder may decrease MaxtTTDepth for pictures at high temporal layers. An encoder may, for example, increase MaxTTDepth for luma and chroma components in intra slices, e.g., while keeping MaxTTDepth the same as MaxBTDepth for inter slices.

In an example, MaxTTDepth may be set according to QT depth. An encoder may set different MaxTTDepths for blocks with different QT depths.

Signaling redundancy reduction may be provided in MTT. One or more (e.g., two) different partitions of a block may achieve the same result. For example, a block partitioned by horizontal BT followed by vertical TT may achieve the same result as a block partitioned by vertical TT followed by horizontal BT. An encoder may be configured to select a partition scheme for a block. The encoder may disallow selection of a partition scheme that has the same result. For example, a block BP may be partitioned (e.g., using horizontal or vertical BT) into one or more (e.g., two) sub-blocks B0 and B1. An encoder may include the partition direction for BP, one or more (e.g., two) partition parameters for B0, and/or a (e.g., one) partition parameter for B1 in a bitstream. A decoder may receive the partition direction for BP. The decoder may receive one or more (e.g., two) partition parameters (e.g., type and/or direction) for B0 and a (e.g., one) partition parameter (e.g., type or direction) for B1. The decoder may derive a second partition parameter for B1 based on, for example, the partition parameters for B0 and the partition direction for BP. For example, the decoder may derive the second partition parameter for B1 if (e.g., only) one option for the second partition parameter (e.g., horizontal or vertical if the parameter is direction, or BT or TT if the parameter is type) is allowed. The encoder may include second partition parameter for B1 in the bitstream, for example if two or more options for the second partition parameter are allowed. The decoder may receive the second partition parameter for B1, for example if two or more options for the second partition parameter are allowed. The second partition parameter may be used to decode the block. One or more (e.g., four) cases may be considered to reduce signaling redundancy in MTT (e.g. as shown by example in FIG. 11).

Figure 11A:
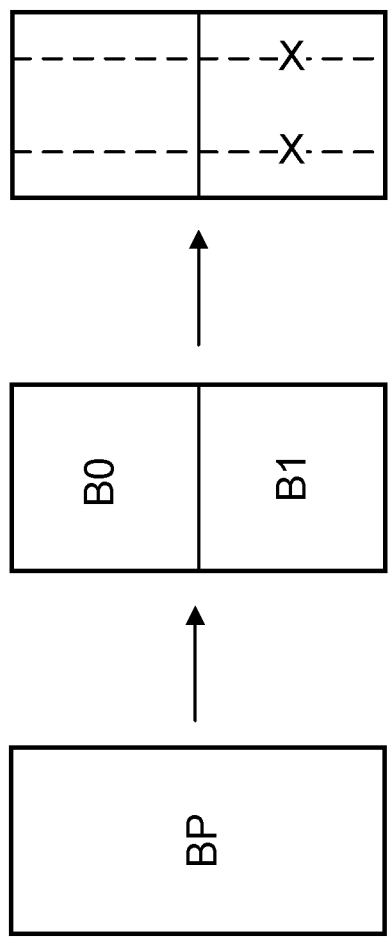
FIGS. 11A-D show examples of signaling redundancy reduction in MTT.
Figure 11B:
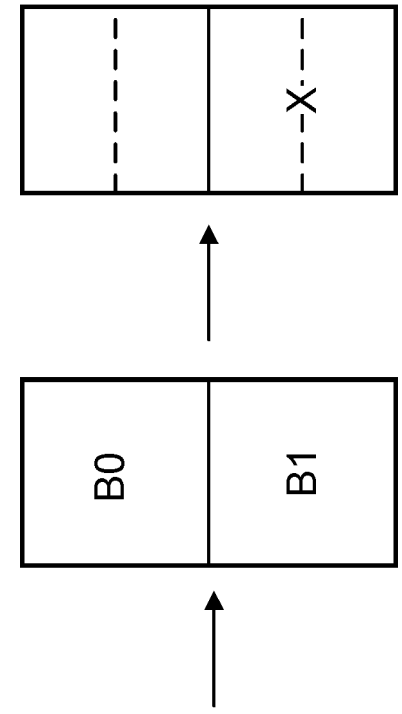
Figure 11C:
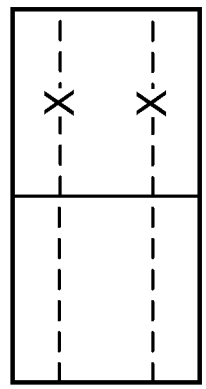
Figure 11C:
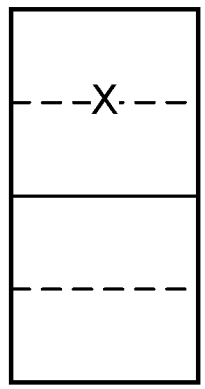
Figure 11C:
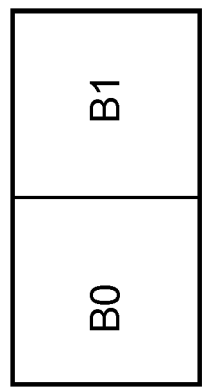
Figure 11C:
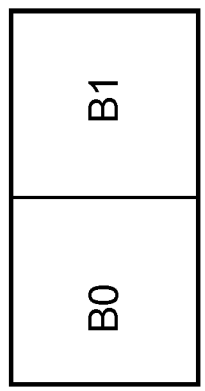
Figure 11C:
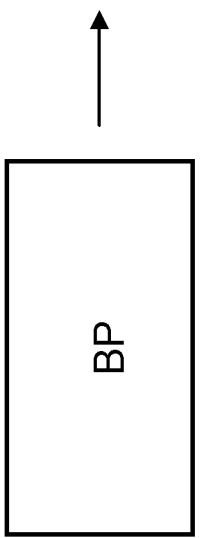
Figure 11D:
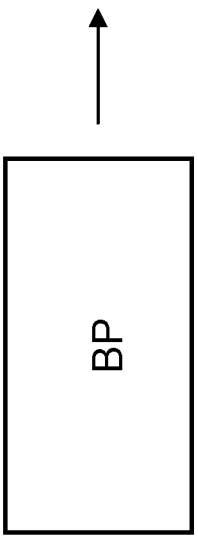

FIGS. 11A-D show examples of signaling redundancy reduction in MTT. FIGS. 11A and 11B show examples of horizontal BT constraints. FIGS. 11C and 11D show examples of vertical BT constraints.

FIG. 11A shows an example of a case where signaling redundancy may be reduced. A block (e.g., block BP in FIG. 11A) may be partitioned by a horizontal BT, and the two resulting sub-blocks (e.g., sibling nodes) may be further partitioned by a vertical TT. Exchanging the order of the two partitions (e.g. partitioning the block with the vertical TT then partitioning three sub-blocks with a horizontal BT) may yield the same partition result. A vertical TT partition may not be applied to a sub-block (e.g., B1 in FIG. 11A), for example, when the block is partitioned by horizontal BT, and the other sub-block (e.g., B0 in FIG. 11A) is further partitioned by vertical TT. An encoder may include in a bitstream and a decoder may receive a partition parameter (e.g., a partition type or partition direction) for a sub-block (e.g., B1). For example, the partition parameter may be included in the bitstream and received if one or more (e.g., two) options (e.g., vertical and/or horizontal for partition direction and BT and/or TT for partition type) are allowed for the partition parameter. A decoder may derive the partition parameter based on the partition directions and/or types of the block and another sub-block (e.g., B0). For example, the decoder may derive the partition parameter if (e.g., only) one option is allowed for the partition parameter.

For example, a block C may be partitioned using horizontal BT into two sub-blocks, C0 and C1. C0 may be further partitioned using vertical TT. An encoder may include indications of the partition direction and type for C and the partition direction and type for C0 in a bitstream. The encoder may include an indication that C1 is partitioned vertically in the bitstream. A decoder may receive the indications. The decoder may derive the partition type for C1 based on the indications. For example, the decoder may derive the partition type for C1 to be BT (e.g., because applying TT to C1 is not allowed).

FIG. 11B shows an example of a case where signaling redundancy may be reduced. A block (e.g., block BP in FIG. 11B) may be partitioned by a horizontal BT, and the two resulting sub-blocks may be further partitioned by a horizontal BT. Partitioning the block and sub-blocks in this manner may yield the same partition result as partitioning the block by a horizontal TT and partitioning a resulting middle block by horizontal BT. A horizontal BT partition may not be applied to a sub-block (e.g., B1 in FIG. 11B), for example, when the block is partitioned by horizontal BT and the other sub-block (e.g., B0 in FIG. 11b) is further partitioned by a horizontal BT. An encoder may include in a bitstream and a decoder may receive a partition parameter (e.g., a partition type or partition direction) for a sub-block (e.g., B1). For example, the partition parameter may be included in the bitstream and received if one or more (e.g., two) options (e.g., vertical and/or horizontal for partition direction and BT and/or TT for partition type) are allowed for the partition parameter. A decoder may derive the partition parameter based on the partition directions and/or types of the block and another sub-block (e.g., B0). For example, the decoder may derive the partition parameter if (e.g., only) one option is allowed for the partition parameter.

For example, a block C may be partitioned using horizontal TT into three sub-blocks, C0, C1, and C2. C1 may be a middle sub-block. An encoder may include indications of the partition direction and type for C in a bitstream. The encoder may include an indication that C1 is partitioned horizontally in the bitstream A decoder may receive the indications. The decoder may derive the partition type for C1 based on the indications. For example, the decoder may derive the partition type for C1 to be TT (e.g., because applying BT to C1 is not allowed).

FIGS. 11C and 11D show examples of cases where signaling redundancy may be reduced, e.g., by changing the horizontal partition in FIGS. 11A and 11B to a vertical partition. For example, as shown in FIG. 11C, horizontal TT may not be applied to a sub-block (e.g., B1 in FIGS. 11C-D), for example, when the block (e.g., block BP in FIGS. 11C-D) is partitioned by vertical BT and the other sub-block (e.g., B0 in FIGS. 11C-D) is further partitioned by horizontal TT. For example, as shown in FIG. 11D, vertical BT may not be applied to the sub-block B1, for example, when the block is partitioned by vertical BT and sub-block B0 is further partitioned by vertical BT. An encoder may include in a bitstream and a decoder may receive a partition parameter (e.g., a partition type or partition direction) for a sub-block (e.g., B1). For example, the partition parameter may be included in the bitstream and received if one or more (e.g., two) options (e.g., vertical and/or horizontal for partition direction and BT and/or TT for partition type) are allowed for the partition parameter. A decoder may derive the partition parameter based on the partition directions and/or types of the block and another sub-block (e.g., B0). For example, the decoder may derive the partition parameter if (e.g., only) one option is allowed for the partition parameter.

Deblocking may be provided in an MTT framework. Deblocking may be applied to one or more (e.g. all) CU boundaries (e.g., QT and/or BT boundaries). CU boundaries may include one or more TT boundaries. Deblocking may be extended to be applied to (e.g. all) TT boundaries. The derivation of boundary strength and/or deblocking filtering may be performed. A block may be partitioned by a TT partition into one or more (e.g., three) sibling nodes. The partition types and/or directions for the sibling nodes may be received and/or derived as described herein. One or more boundaries of the sibling nodes may be determined. A deblocking filter may be applied to the boundaries.

Figure 12:
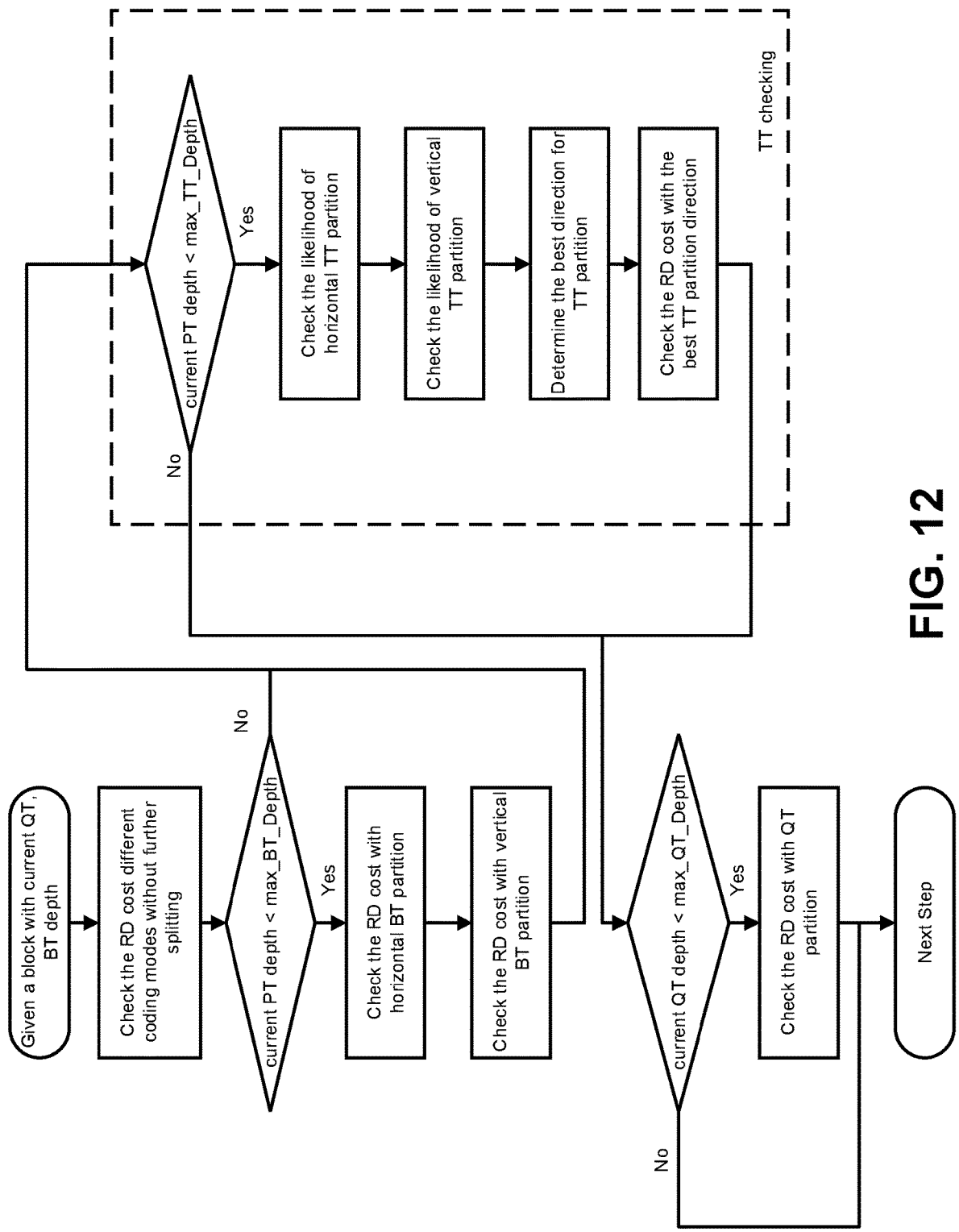
FIG. 12 shows an example of fast encoding for MTT.

Fast MTT encoding may be performed as described herein. Early termination and best TT direction determination may be performed, for example before TT RD cost checking. FIG. 12 shows an example of fast encoding for MTT. A dashed block may indicate a TT RD checking process. A TT partition may be tested in an encoding, for example, (e.g. only) when a current PT depth is smaller than a maximum TT depth and a current block size is smaller than the maximum BT size.

Figure 13:
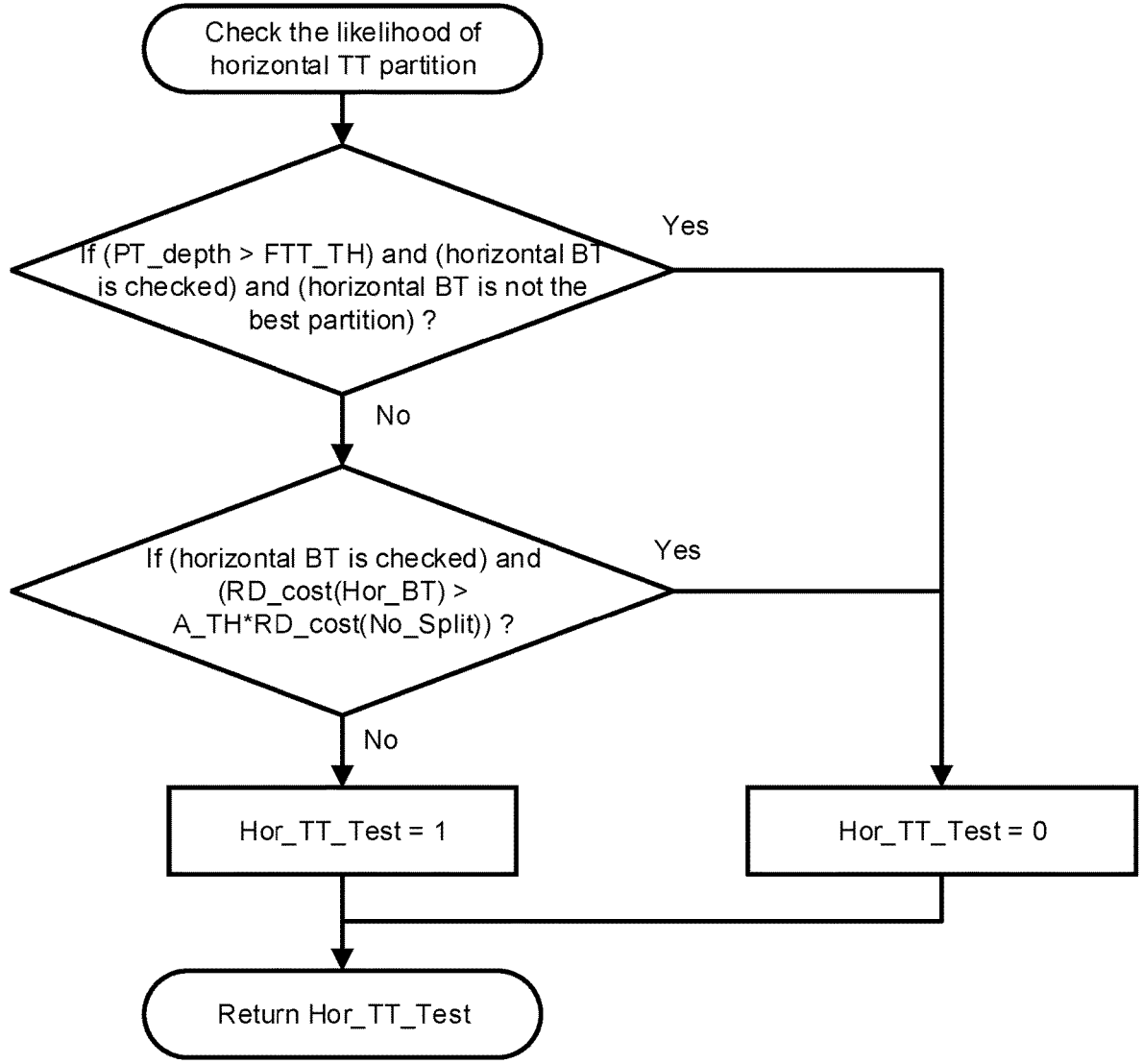
FIG. 13 shows an example of likelihood checking for a horizontal TT partition.

A likelihood of horizontal TT partition and vertical TT partition may be checked, for example, before TT partition RD cost checking. A likelihood of a TT partition at a direction being low may indicate that a TT partition in that direction is not the best partition scheme for a current block. RD cost checking of the TT partition in that direction may be skipped. FIG. 13 shows an example of likelihood checking for a horizontal TT partition. A test flag (e.g., Hor_TT_Test flag) may indicate whether an encoder tests a horizontal TT partition. A likelihood of horizontal TT partition may be low, and a flag Hor_TT_Test may be set to a value indicating an encoder may skip horizontal TT partition checking (e.g., 0), for example, when a current PT depth is greater than a pre-defined threshold FTT_TH (e.g. 1) and a horizontal BT partition is not the best partition scheme. An RD cost of a horizontal BT partition may be compared with an RD cost without partition. A horizontal TT may not be tested, and the flag Hor_TT_Test may be set to the value indicating an encoder may skip horizontal TT partition checking (e.g., 0), for example, when an RD cost of a horizontal BT partition is greater than an RD cost without partition (e.g., the ratio is greater than a pre-defined threshold A_TH). A likelihood of a horizontal TT partition may be high and a flag Hor_TT_Test may be set to indicating an encoder may test horizontal TT partition checking (e.g., 1), for example, in remaining cases. Likelihood checking for a vertical TT partition may be performed in a similar manner.

Figure 14:
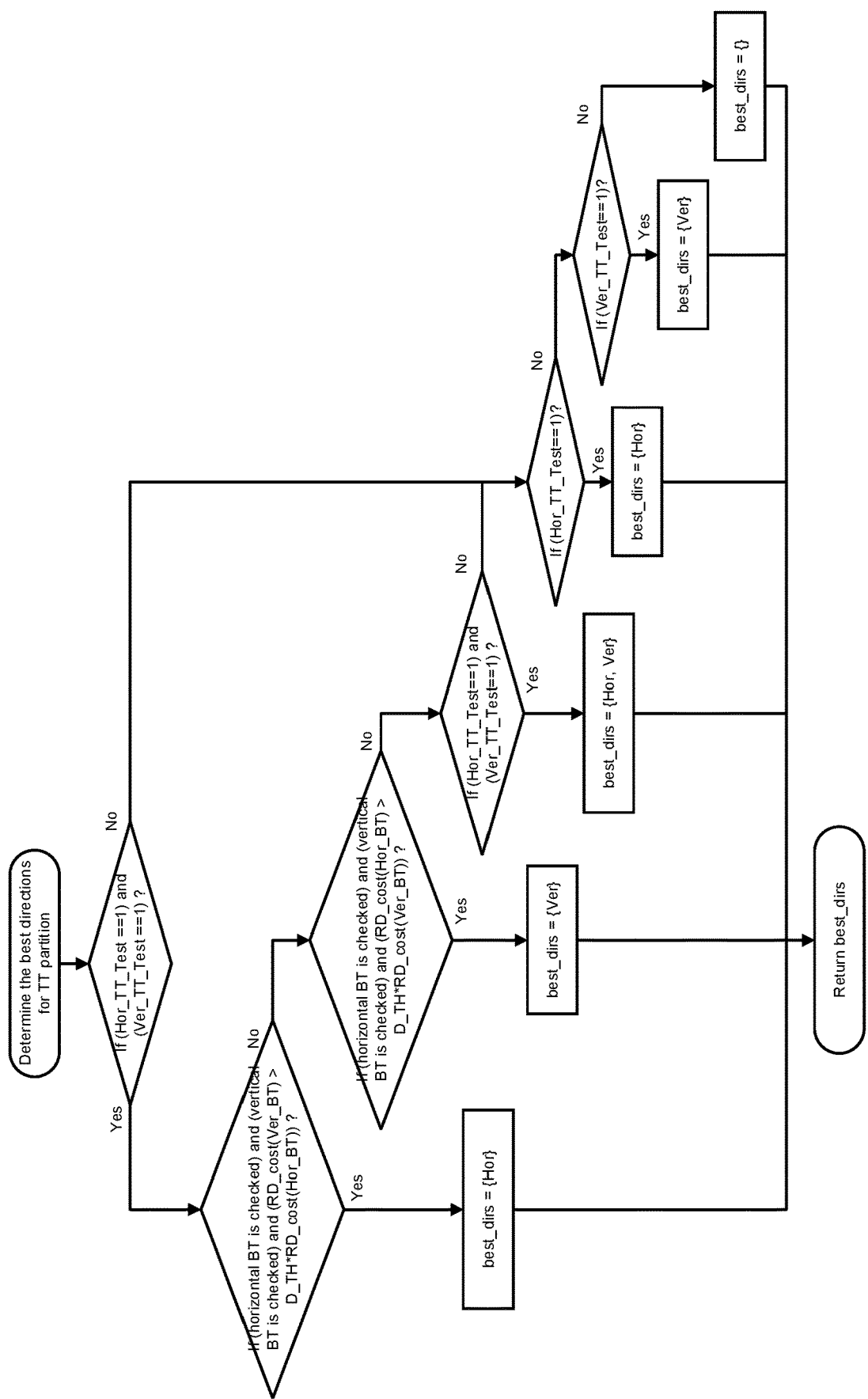
FIG. 14 shows an example determination of the best candidate directions for TT partition testing.

One or more candidate directions (e.g., best candidate directions) may be determined based on, for example, RD cost of BT partitions). The candidate directions may be determined after likelihood checking for a TT partition. FIG. 14 shows an example determination of the best candidate directions for TT partition checking. An RD cost of a horizontal BT may be compared to an RD cost of a vertical BT. The RD costs of vertical and/or horizontal BT may be tested for a current block, for example, when (e.g. both) a horizontal partition and a vertical TT partition are tested. Both directions may be considered as the best candidate directions for TT partition checking, for example, when a ratio of the two RD costs is smaller than a pre-defined threshold D_TH. A direction with a smaller BT partition RD cost may be considered as the best candidate direction for TT partition checking. A TT partition may be treated as the best candidate direction, for example, when the TT partition is the only partition that is tested. An encoder may skip testing for one or more (e.g. two) directions for a TT partition, for example, based on a best direction determination.

Fast encoding may be extended, for example by reusing a previous coding result, as shown by example in FIG. 6. FIGS. 15A-E show examples of coding result reuse for different MTT partitions. FIG. 15 shows five example cases where coding for a sub-block (e.g., a top-left sub-block) may be reused. FIG. 15A shows an example of a block partitioned by a horizontal BT followed by horizontal BT partitioning for the top sub-block. The top-left block B0 may be the same, for example, when the block is partitioned by a horizontal TT. FIG. 15B shows an example similar to the example in FIG. 15A by changing a horizontal direction to a vertical direction. FIG. 15C shows an example of a block partitioned by a horizontal BT followed by vertical TT partitioning for the top sub-block. The top-left block B0 may be the same, for example, when the block is partitioned by a vertical TT followed by a horizontal BT partitioning for the left sub-block. FIG. 15D shows an example similar to the example in FIG. 15C by switching a horizontal direction and a vertical direction. FIG. 15E shows an example of a block partitioned by a horizontal TT followed by vertical TT partitioning for the top sub-block. The top-left block B0 may be the same, for example, when the block is partitioned by a vertical TT followed by horizontal TT partitioning for the left sub-block.

In an example, early termination may be applied to pictures at the highest temporal layers. A temporal layer of a picture may indicate whether the picture is used as a reference for coding another picture. A picture at a temporal layer may be used to code other pictures at the same temporal layer or a higher temporal layer. For example, a picture at a lower temporal layer (e.g., temporal layer 0) may be used to code pictures at higher temporal layers (e.g., temporal layer 2). A picture at a higher temporal layer may refer to the picture at the lower temporal layer. The picture at the lower temporal layer may have more bits allocated than the picture at the higher temporal layer. An encoder may test RD performance, for example, using a coding mode (e.g., without further partition). An encoder may skip horizontal and vertical TT checking, for example, when a best mode is a very efficient coding mode (e.g., a skip mode) and a current PT depth is no smaller than a maximum PT depth of its neighboring CUs (e.g. left and/or above, etc.). An encoder may skip horizontal and vertical TT checking, for example, because a block selects a skip mode and a tree depth is above a threshold. An early termination may be applied to pictures with a close reference picture in a reference picture list, for example, in terms of temporal distance (e.g. regardless of which temporal layer the picture belongs to). A temporal distance between two pictures may be measured by an absolute difference of their picture order counts.

Content analysis may be applied (e.g. in addition or alternative to an RD cost based fast encoding scheme) to determine which partitions to test. In an example (e.g. for a block B), one or more tests may be performed, for example, to determine whether to test (e.g. only) BT or TT. Example tests are presented below.

B may be partitioned into two horizontal or vertical parts using BT. A content analysis may be performed for a (e.g. each) BT part. In an example, average and/or variance may be calculated for a (e.g. each) BT. These may be denoted as A(BT0), A(BT1), V(BT0) and V(BT1).

B may be partitioned into three horizontal or vertical parts using TT. Content analysis may be performed for a (e.g. each) TT part. In an example, average and/or variance may be calculated for a (e.g. each) BT part. These may be denoted as A(TT0), A(TT1), A(TT2), V(TT0), V(TT1) and V(TT1).

A difference between one or more (e.g., two) BT statistics may be calculated. For example, |A(BT0)−A(BT1)| and |V(BT0)−V(BT1)| may be calculated. A difference between one or more (e.g., three) TT statistics may be calculated. For example, max(|A(TT0)−A(TT1)|, |A(TT1)−A(TT2)|, |A(TT2)−A(TT0)|), and max(|V(TT0)−V(TT1)|, |V(TT1)−V(TT2)|, |V(TT2)−V(TT0)|) may be calculated.

BT/TT statistics may be consolidated, for example, using a weighted combination of differences in average and variance, e.g., Diff_Stats(BT)=|A(BT0)−A(BT1)|+w*|V(BT0)−V(BT1)|. Diff_Stats(TT) may be calculated in a similar manner. A BT partition may be tested (e.g. only) for block B, for example, when a difference in BT statistics between the two BTs is larger than a difference in TT statistics between the three TTs. A TT partition may be tested (e.g. only) for block B, for example, when a difference in TT statistics between the three TTs is larger than a difference in BT statistics between the two BTs.

Average and variance are used as examples of content analysis. Other content characteristics (e.g. horizontal/vertical gradient along partition boundaries) may be collected and used in fast encoding decisions.

Fast MTT encoding may be implemented with a restriction on coding unit size.

As noted in the description (e.g., with respect to FIG. 12), an encoder may check the RD cost for different partitions (e.g., non-partition, horizontal BT partition, vertical BT partition, horizontal TT partition, vertical TT partition, QT partition) for the current coding block. The encoder may select the best partition with minimal RD cost. Fast encoding may be performed as disclosed herein (e.g., by inferring some directions without RD cost checking).

Figure 16:
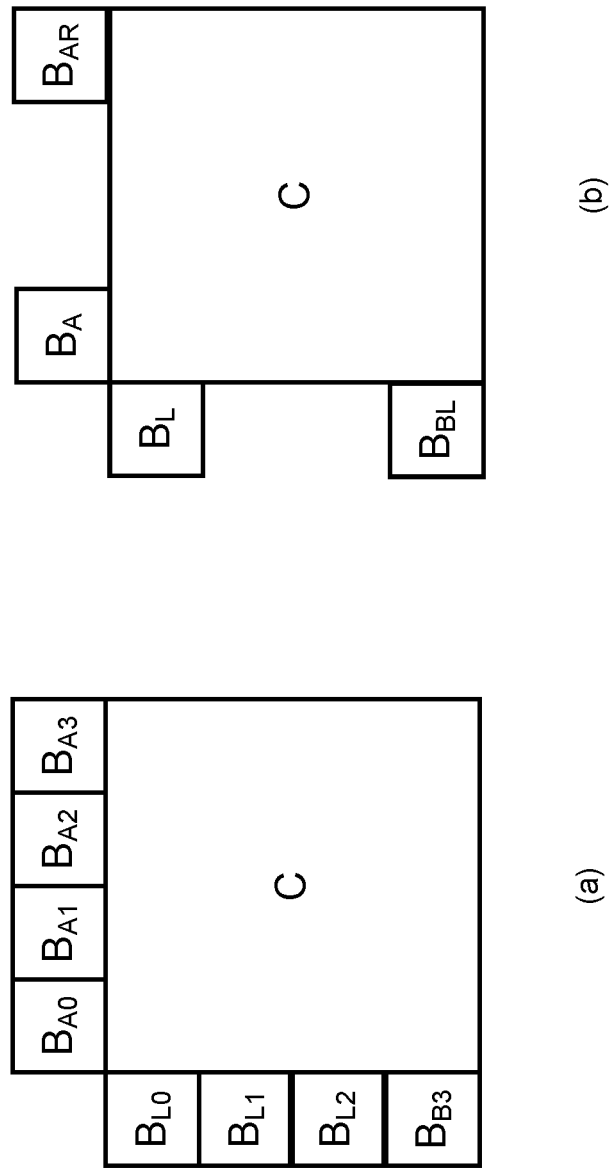
FIG. 16 is an example of a neighboring block sets for CU size checking.

Fast MTT encoding by considering the CU size may be implemented. A correlation may exist between a current CU and its spatially neighboring CUs. CU size may change gradually from its neighbors. Local CU size information may be used to accelerate the MTT encoding. For example, before the current coding block is encoded, the encoder may check the size of neighboring coded CUs and find the minimum and maximum CU size from the neighbors. A minimum CU size ($CU\_SIZE_{MIN}$) and a maximum CU size ($CU\_SIZE_{MAX}$) may be determined for the current coding block using Equations (7) and (8):

$$CU\_SIZE_{MIN} = \max(SIZE\_MIN, \min(CUSize(B_i))/2^T), B_i \in NBS \quad (7)$$

$$CU\_SIZE_{MAX} = \min(SIZE\_MAX, \max(CUSize(B_i))*2^T), B_i \in NBS \quad (8)$$

where $B_i$ may be the i-th neighboring block and may belong to the neighboring block set (NBS) of the current block, T may be a predefined threshold (e.g., 1), SIZE_MIN may be the minimum CU size allowed (e.g., 4×4), and SIZE_MAX may be the maximum CU size allowed (e.g., 128×128). The NBS may be defined in different ways. For example, in FIG. 16, at (a) (e.g., the left side of FIG. 16), the NBS of current block C may be defined as one or more (e.g., all) neighboring blocks from the left direction and one or more (e.g., all) neighboring blocks from the above direction. In an example, in FIG. 16, at (b) (e.g., the right side of FIG. 16), the NBS may be defined as one or more (e.g., four) corner neighboring blocks. In an example, if the size of a current coding block is greater than $CU\_SIZE_{MAX}$, the RD cost checking of non-partition may be skipped and the current coding block may be further partitioned by BT, TT or QT. If the size of the current coding block is smaller than $CU\_SIZE_{MIN}$, then the RD cost checking for BT, TT or QT may be skipped. In an example, a limited CU size may be checked.

Threshold T may determine the variation of CU size between the current block and its neighbors. In an example, a smaller T may have a smaller (e.g., relatively) variation and a lower encoding complexity. T may be set differently based on the current coding block size. For example, if the size of a current coding block is large, then T may be set larger (e.g., 2) to allow a larger variation for the current coding block (e.g., because the current coding block has more variation relative to the size of neighboring CUs). In another example, if the size of a current coding block is small, then T may be smaller (e.g., 1) to allow smaller variation for the current coding block (e.g., because the current coding block is already tested with different partitioning from its parent). In another example, if the size of a current coding block is small comparable to the minimum CU size (e.g. 2×SIZE_MIN), then T may be set to 0 to disallow variation for fast encoding. For different partition modes (e.g., such as BT, TT, or QT), T may be different. For example, T may be set larger to allow a large variation for QT partition, and may be set smaller for BT and TT.

If a neighboring block $B_i$ in a NBS is not available (e.g., out of picture boundary or not coded yet), the Equations (7) and (8) may be evaluated in one or more (e.g., two) ways. For example, the neighboring block from $B_i$ may be excluded from the NBS. If the NBS is empty (e.g., there are no coded neighboring CUs available), then $CU\_SIZE_{MIN}$ may be set to SIZE_MIN and $CU\_SIZE_{MAX}$ may be set to SIZE_MAX. For example, one or more (e.g., all) unavailable neighboring blocks may be counted. If the percentage of unavailable neighboring blocks is greater than a predefined percentage, then $CU\_SIZE_{MIN}$ may be set to SIZE_MIN and $CU\_SIZE_{MAX}$ may be set to SIZE_MAX.

A CU size may be calculated by the depth of CU using Equation (9):

$$CU\_Size = SIZE\_MAX/2^{depth} \quad (9)$$

The depth of the CU may be used as a measurement for the CU size (e.g., to implement fast MTT encoding).

Figure 17A:
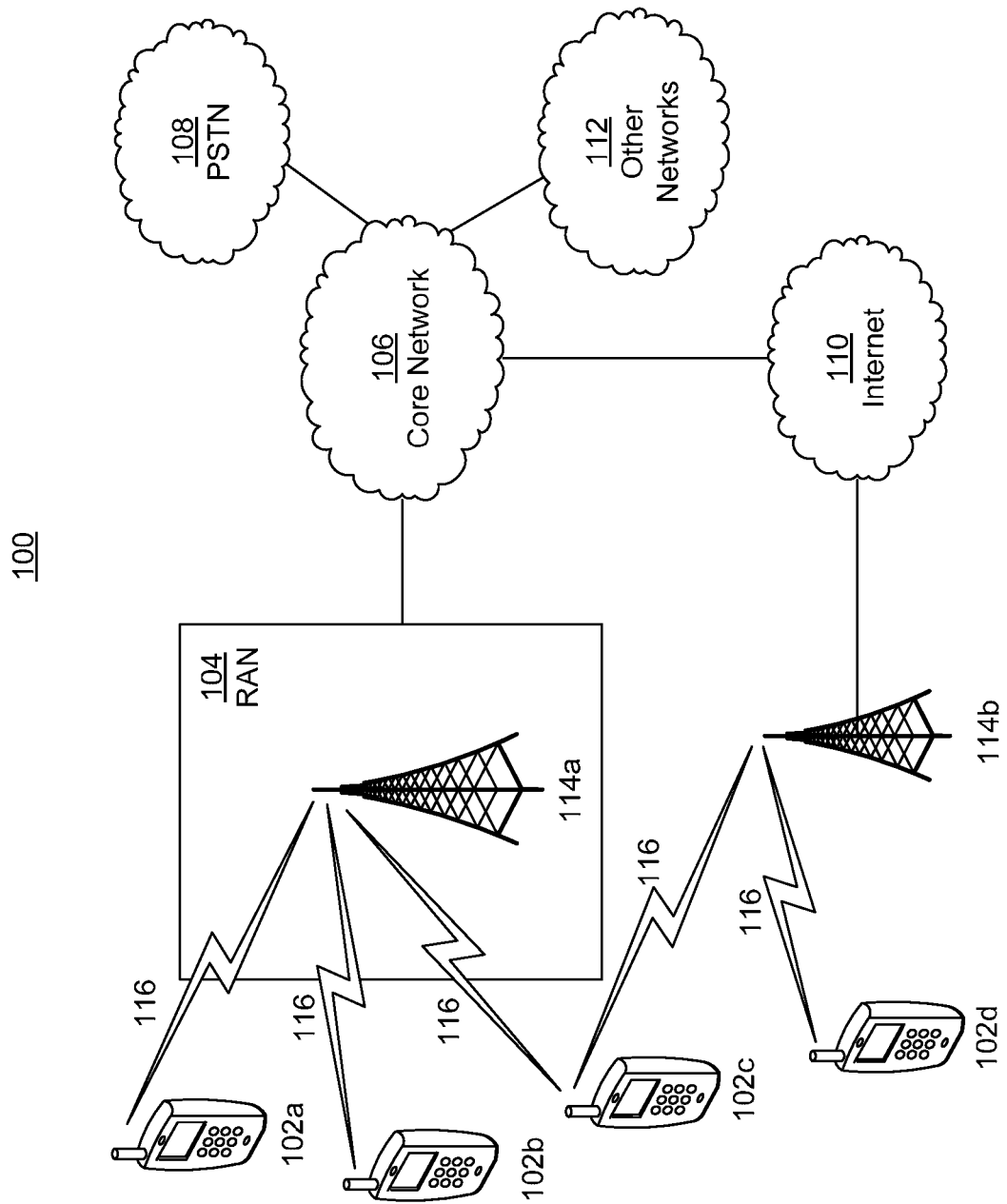
FIG. 17A is a system diagram illustrating an example communications system in which one or more disclosed embodiments may be implemented.

FIG. 17A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 17A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g. remote surgery), an industrial device and applications (e.g. a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g. radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g. an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 17A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g. for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g. WCDMA, CDMA2000, GSM, LTE, LTE-A, LTE-A Pro, NR etc.) to establish a picocell or femtocell. As shown in FIG. 17A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 17A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g. the WTRUs 102a, 102b, 102c, 102d may include multiple transceivers for communicating with different wireless networks over different wireless links). For example, the WTRU 102c shown in FIG. 17A may be configured to communicate with the base station 114a, which may employ a cellular-based radio technology, and with the base station 114b, which may employ an IEEE 802 radio technology.

Figure 17B:
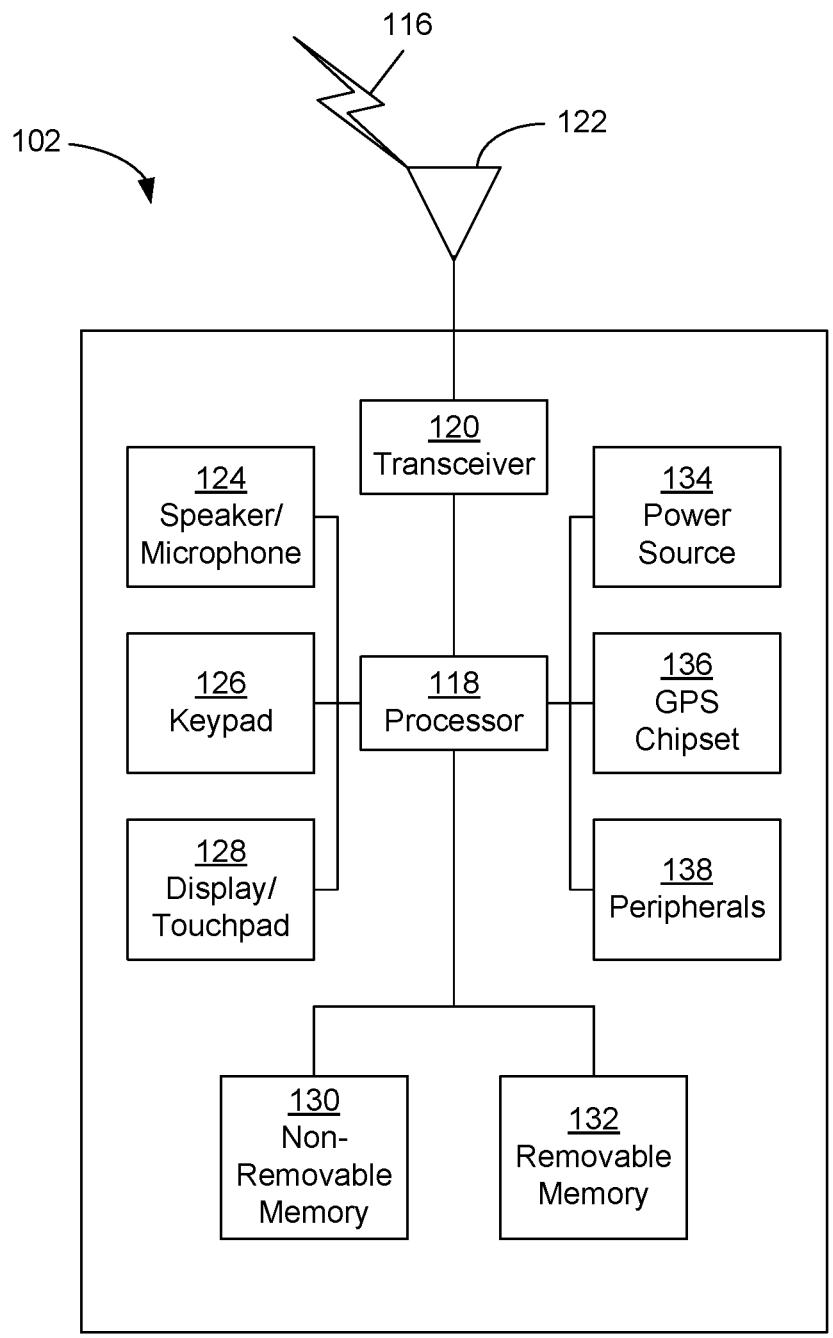
FIG. 17B is a system diagram illustrating an example wireless transmit/receive unit (WTRU) that may be used within the communications system illustrated in FIG. 17A according to an embodiment.

FIG. 17B is a system diagram illustrating an example WTRU 102. As shown in FIG. 17B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 17B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g. the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 17B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g. multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g. a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g. nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g. longitude and latitude) regarding the current location of the WTRU 102. In addition to, or in lieu of, the information from the GPS chipset 136, the WTRU 102 may receive location information over the air interface 116 from a base station (e.g. base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor The WTRU 102 may include a full duplex radio for which transmission and reception of some or all of the signals (e.g. associated with particular subframes for both the UL (e.g. for transmission) and downlink (e.g. for reception) may be concurrent and/or simultaneous. The full duplex radio may include an interference management unit to reduce and or substantially eliminate self-interference via either hardware (e.g. a choke) or signal processing via a processor (e.g. a separate processor (not shown) or via processor 118). In an embodiment, the WRTU 102 may include a half-duplex radio for which transmission and reception of some or all of the signals (e.g. associated with particular subframes for either the UL (e.g. for transmission) or the downlink (e.g. for reception))

Figure 17C:
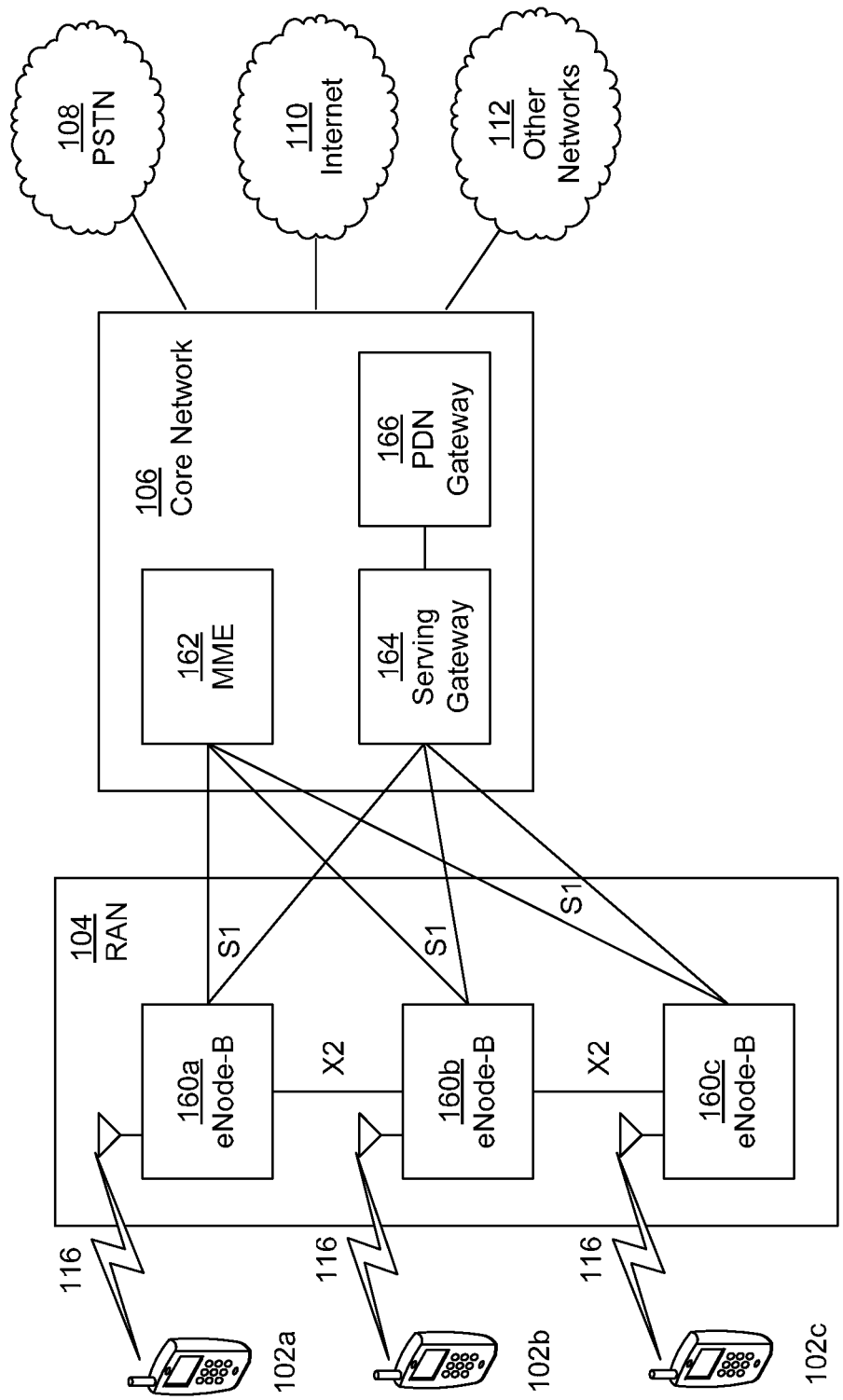
FIG. 17C is a system diagram illustrating an example radio access network (RAN) and an example core network (CN) that may be used within the communications system illustrated in FIG. 17A according to an embodiment.

FIG. 17C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 17C, the eNode-Bs 160a, 160b, 160c may communicate with one another over an X2 interface.

The CN 106 shown in FIG. 17C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g. an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers Although the WTRU is described in FIGS. 17A-17D as a wireless terminal, it is contemplated that in certain representative embodiments that such a terminal may use (e.g. temporarily or permanently) wired communication interfaces with the communication network.

In representative embodiments, the other network 112 may be a WLAN

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g. directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g. all of the STAs) within or using the IBSS may communicate directly with each other. The IBSS mode of communication may sometimes be referred to herein as an "ad-hoc" mode of communication When using the 802.11ac infrastructure mode of operation or a similar mode of operations, the AP may transmit a beacon on a fixed channel, such as a primary channel. The primary channel may be a fixed width (e.g. 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g. every STA), including the AP, may sense the primary channel. If the primary channel is sensed/detected and/or determined to be busy by a particular STA, the particular STA may back off. One STA (e.g. only one station) may transmit at any given time in a given BSS High Throughput (HT) STAs may use a 40 MHz wide channel for communication, for example, via a combination of the primary 20 MHz channel with an adjacent or nonadjacent 20 MHz channel to form a 40 MHz wide channel Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC)

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g. only support for) certain and/or limited bandwidths. The MTC devices may include a battery with a battery life above a threshold (e.g. to maintain a very long battery life)

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g. MTC type devices) that support (e.g. only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

Figure 17D:
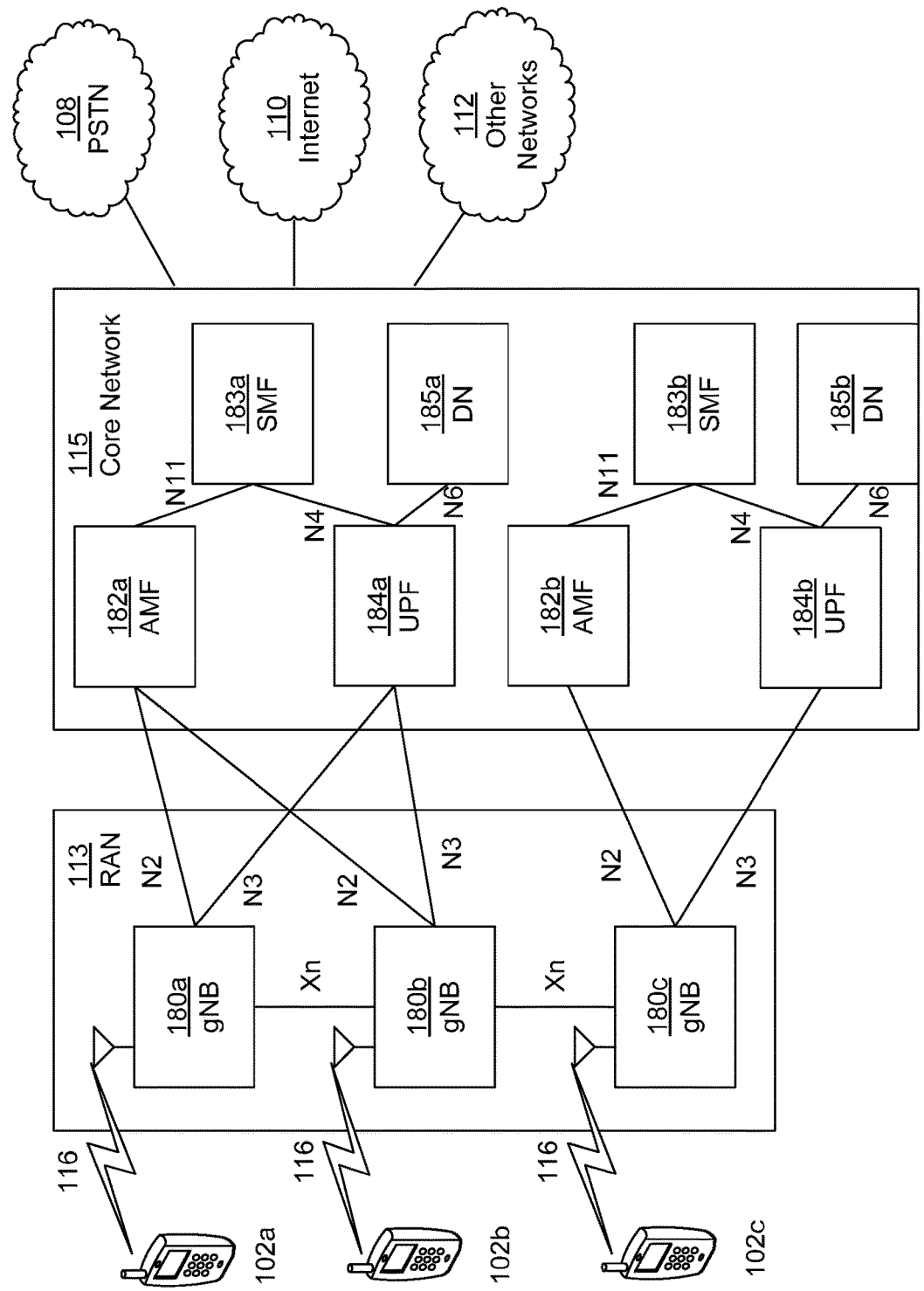
FIG. 17D is a system diagram illustrating a further example RAN and a further example CN that may be used within the communications system illustrated in FIG. 17A according to an embodiment.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code FIG. 17D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g. containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g. such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 17D, the gNBs 180a, 180b, 180c may communicate with one another over an Xn interface.

The CN 115 shown in FIG. 17D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g. handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g. an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 17A-17D, and the corresponding description of FIGS. 17A-17D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g. testing) wired and/or wireless communication network in order to implement testing of one or more components. The one or more emulation devices may be test equipment. Direct RF coupling and/or wireless communications via RF circuitry (e.g. which may include one or more antennas) may be used by the emulation devices to transmit and/or receive data.

Systems, methods, and instrumentalities have been disclosed for Multi-Type Tree (MTT) coding. Tree type signaling may be provided for MTT. Context encoding may be based on a partition type (e.g. Binary-Tree (BT) or Triple-Tree (TT)) of neighboring Coding Units (CUs). A maximum tree depth restriction may be applied, e.g., to a TT partition. Signaling redundancy may be removed in MTT. Deblocking in MTT may support Quad-Tree (QT), BT and TT boundaries. Fast MTT encoding be performed.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:
1. A method for video decoding, the method comprising:
  obtaining a block associated with a picture, wherein the block comprises a plurality of nodes;
  determining a partition type for the block, a partition direction for the block, and a first partition parameter associated with a node of the plurality of nodes;
  determining, based on the partition type for the block, the partition direction for the block, and the first partition parameter associated with the node of the plurality of nodes, whether an indication of a second partition parameter associated with the node is included in video data;

obtaining the second partition parameter based on the determination of whether the indication of the second partition parameter associated with the node is included in the video data, wherein the second partition parameter is indicative of a binary tree (BT) splitting allowability; and decoding the picture based on the first partition parameter and the second partition parameter associated with the node, wherein decoding the picture further comprises:

determining that multi-type tree (MTT) is used for the picture, wherein the picture comprises a triple tee (TT) block generated using TT partitioning and a BT block generated using BT partitioning, wherein a first minimum partition size is used for the TT partitioning, and a second minimum partition size is used for the BT partitioning, and wherein the first minimum partition size and the second minimum partition size are different;

obtaining a deblocking filter that is applicable to the TT block and the BT block;

determining a boundary of the TT block; and applying the obtained deblocking filter to the determined boundary of the TT block.

2. The method of claim 1, wherein, based on a condition that the indication of the second partition parameter associated with the node is determined to be included in the video data, obtaining the second partition parameter comprises:

parsing the indication of the second partition parameter in the video data; and determining the second partition parameter based on the indication.

3. The method of claim 1, wherein the partition type for the block is TT, wherein the node is a middle sibling node, and wherein the first partition parameter indicates a partition type for the middle sibling node and the second partition parameter indicates a partition direction for the middle sibling node, and wherein, based on a condition that the partition type for the middle sibling node is BT, the partition direction for the middle sibling node is determined to be orthogonal to the partition direction for the block.

4. The method of claim 1, wherein the partition type for the block is TT, wherein the node is a middle sibling node, and wherein the first partition parameter indicates a partition type for the middle sibling node, and the second partition parameter indicates a partition direction for the middle sibling node, and wherein, based on a condition that the partition type for the middle sibling node is TT, the partition direction for the middle sibling node is received.

5. The method of claim 1, wherein the partition type for the block is BT, and wherein the node is a first node of the plurality of nodes, the first partition parameter indicates a partition direction for the first node, and the second partition parameter indicates a partition type for the first node, the plurality of nodes comprises a second node, and wherein, based on a condition that a partition direction for the second node and the partition direction for the first node are different or that the partition type for the second node is TT and the partition direction for the second node and the partition direction for the first node are both the same as the partition direction for the block, the partition type for the first node is received.

6. A non-transitory computer-readable medium including instructions for causing one or more processors to perform the method of claim 1.

7. The method of claim 1, wherein the second partition parameter is indicative of a BT vertical splitting allowability.

8. A method for video encoding, the method comprising:

obtaining a block associated with a picture, wherein the block comprises a plurality of nodes;

determining a partition type for the block, a partition direction for the block, and a first partition parameter associated with a node of the plurality of nodes;

determining, based on the partition type for the block, the partition direction for the block, and the first partition parameter associated with the node of the plurality of nodes, whether to include an indication of a second partition parameter associated with the node in video data, wherein the second partition parameter is indicative of a binary tree (BT) splitting allowability;

encoding the picture based on the first partition parameter and the second partition parameter associated with the node, wherein encoding the picture further comprises:

determining that multi-type tree (MTT) is used for the picture, wherein the picture comprises a triple tee (TT) block generated using TT partitioning and a BT block generated using BT partitioning, wherein a first minimum partition size is used for the TT partitioning, and a second minimum partition size is used for the BT partitioning, and wherein the first minimum partition size and the second minimum partition size are different;

obtaining a deblocking filter that is applicable to the TT block and the BT block;

determining a boundary of the TT block; and applying the obtained deblocking filter to the determined boundary of the TT block;

generating a residual; and including the residual in the video data.

9. The method of claim 8, wherein the partition type for the block is TT and wherein the first partition parameter indicates a partition direction for the node, and the second partition parameter indicates a partition type for the node, and wherein, based on a condition that the partition direction for the node is the same as the partition direction for the block, the partition type for the node is not included in the video data.

10. The method of claim 8, wherein the partition type for the block is TT and wherein the first partition parameter indicates a partition direction for the node, and the second partition parameter indicates a partition type for the node, and wherein, based on a condition that the partition direction for the node is not the same as the partition direction for the block, the partition type for the node is included in the video data.

11. The method of claim 8, wherein the second partition parameter is indicative of a BT vertical splitting allowability.

12. A device for video decoding, comprising:

a processor configured to:

obtain a block associated with a picture, wherein the block comprises a plurality of nodes;

determine a partition type for the block, a partition direction for the block, and a first partition parameter associated with a node of the plurality of nodes;

determine, based on the partition type for the block, the partition direction for the block, and the first partition parameter associated with the node of the plurality of nodes, whether an indication of a second partition parameter associated with the node is included in video data;

obtain the second partition parameter based on the determination of whether the indication of the second partition parameter associated with the node is included in the video data, wherein the second partition parameter is indicative of a binary tree (BT) splitting allowability; and decode the picture based on the first partition parameter and the second partition parameter associated with the node, wherein the processor is further configured to:

determine that multi-type tree (MTT) is used for the picture, wherein the picture comprises a triple tee (TT) block generated using TT partitioning and a BT block generated using BT partitioning, wherein a first minimum partition size is used for the TT partitioning, and a second minimum partition size is used for the BT partitioning, and wherein the first minimum partition size and the second minimum partition size are different;

obtain a deblocking filter that is applicable to the TT block and the BT block;

determine a boundary of the TT block; and apply the obtained deblocking filter to the determined boundary of the TT block.

13. The device of claim 12, wherein, based on a condition that the indication of the second partition parameter associated with the node is determined to be included in the video data, the processor is further configured to:

receive the indication of the second partition parameter in the video data; and determine the second partition parameter based on the indication.

14. The device of claim 12, wherein the partition type for the block is TT, wherein the node is a middle sibling node, and wherein the first partition parameter indicates a partition direction for the middle sibling node and the second partition parameter indicates a partition type for the middle sibling node, and wherein, based on a condition that the partition direction for the middle sibling node is the same as the partition direction for the block, the partition type for the middle sibling node is derived to be TT.

15. The device of claim 12, wherein the partition type for the block is TT, wherein the node is a middle sibling node, and wherein the first partition parameter indicates a partition direction for the middle sibling node and the second partition parameter indicates a partition type for the middle sibling node, and wherein, based on a condition that the partition direction for the middle sibling node is not the same as the partition direction for the block, the partition type for the middle sibling node is received.

16. The device of claim 12, wherein, based on a condition that the indication of the second partition parameter is not included in the video data, the second partition parameter associated with the node is obtained based on the first partition parameter and the partition direction for the block.

17. The device of claim 12, wherein the second partition parameter is indicative of a BT horizontal splitting allowability.

18. A device for video encoding, comprising:
a processor configured to:

obtain a block associated with a picture, wherein the block comprises a plurality of nodes;

determine a partition type for the block, a partition direction for the block, and a first partition parameter associated with a node of the plurality of nodes;

determine, based on the partition type for the block, the partition direction for the block, and the first partition parameter associated with the node of the plurality of nodes, whether to include an indication of a second partition parameter associated with the node in video data, wherein the second partition parameter is indicative of a binary tree (BT) splitting allowability;

encode the picture based on the first partition parameter and the second partition parameter associated with the node, wherein the processor is further configured to:

determine that multi-type tree (MTT) is used for the picture, wherein the picture comprises a triple tee (TT) block generated using TT partitioning and a BT block generated using BT partitioning, wherein a first minimum partition size is used for the TT partitioning, and a second minimum partition size is used for the BT partitioning, and wherein the first minimum partition size and the second minimum partition size are different;

obtain a deblocking filter that is applicable to the TT block and the BT block;

determine a boundary of the TT block; and apply the obtained deblocking filter to the determined boundary of the TT block;

generate a residual; and include the residual in the video data.

19. The device of claim 18, wherein the partition type for the block is TT and wherein the first partition parameter indicates a partition direction for the node, and the second partition parameter indicates a partition type for the node, and wherein, based on a condition that the partition direction for the node is the same as the partition direction for the block, the partition type for the node is not included in the video data.

20. The device of claim 18, wherein the second partition parameter is indicative of a BT horizontal splitting allowability.

* * * * *